(12) United States Patent
Konishi

(10) Patent No.: US 11,843,861 B2
(45) Date of Patent: Dec. 12, 2023

(54) APPARATUS, METHOD, AND STORAGE MEDIA

(71) Applicant: CANON KABUSHIKI KAISHA, Tokyo (JP)

(72) Inventor: Kazuki Konishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 17/850,315

(22) Filed: Jun. 27, 2022

(65) Prior Publication Data

US 2022/0417436 A1 Dec. 29, 2022

(30) Foreign Application Priority Data

Jun. 29, 2021 (JP) .................................. 2021-108058

(51) Int. Cl.
*H04N 23/68* (2023.01)

(52) U.S. Cl.
CPC ....... *H04N 23/683* (2023.01); *H04N 23/6811* (2023.01)

(58) Field of Classification Search
None
See application file for complete search history.

(56) References Cited

U.S. PATENT DOCUMENTS

| | | | | |
|---|---|---|---|---|
| 10,200,612 | B2* | 2/2019 | Kuchiki | H04N 23/6811 |
| 10,812,715 | B2* | 10/2020 | Ishita | H04N 23/687 |
| 11,070,729 | B2* | 7/2021 | Midorikawa | H04N 23/67 |
| 11,431,907 | B2* | 8/2022 | Saito | H04N 23/6812 |
| 11,558,553 | B2* | 1/2023 | Song | H04N 23/683 |
| 11,575,834 | B2* | 2/2023 | Narita | H04N 23/6811 |
| 2017/0264824 | A1* | 9/2017 | Kuchiki | G06T 7/11 |
| 2021/0185231 | A1* | 6/2021 | Narita | H04N 23/667 |
| 2022/0256085 | A1* | 8/2022 | Sugaya | H04N 23/6811 |
| 2023/0136616 | A1* | 5/2023 | Narita | G06V 10/25 348/207.99 |

FOREIGN PATENT DOCUMENTS

| | | |
|---|---|---|
| JP | H05161053 A | 6/1993 |
| JP | 2019095630 A | 6/2019 |

* cited by examiner

*Primary Examiner* — Cynthia Segura
(74) *Attorney, Agent, or Firm* — CANON U.S.A., INC. IP Division

(57) ABSTRACT

An apparatus includes one or more processors and/or circuitry which function as: an object detection unit configured to detect a main object, a first motion detection unit configured to detect a motion vector of the main object, a second motion detection unit configured to detect a movement of an image capturing apparatus, a control unit configured to control a correction unit, and a determination unit configured to determine whether the main object is changed between a first timing when a first image is captured and a second timing when a second image is captured. In a case where the determination unit determines that the main object is changed, the control unit changes a control from image blur correction based on the motion vector of the main object to image blur correction based on the movement of the image capturing apparatus.

20 Claims, 7 Drawing Sheets

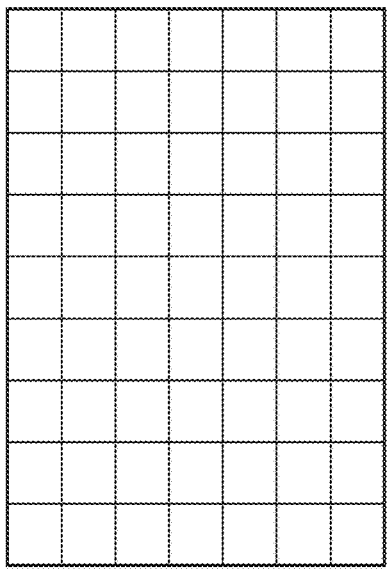
FIG.5A
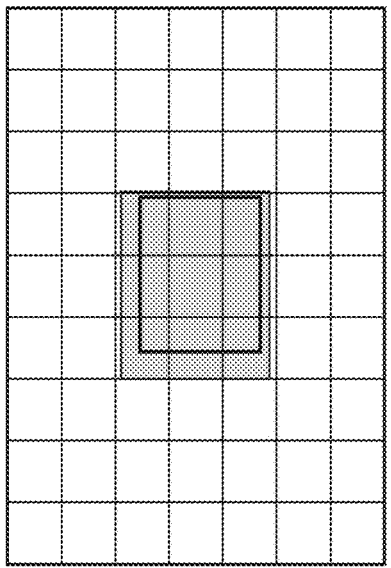
FIG.5B
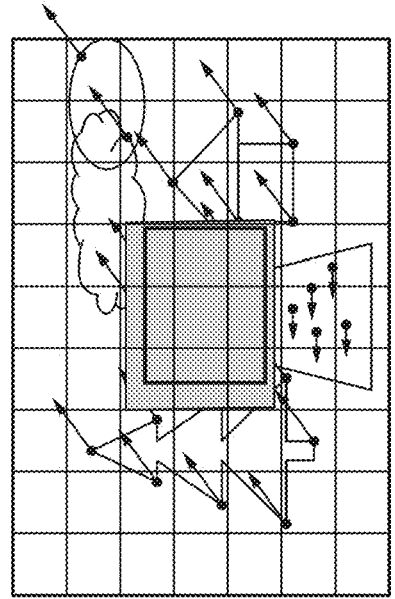
FIG.5C
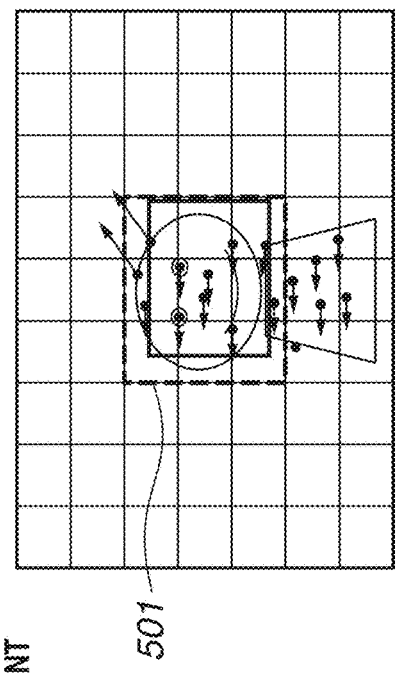
FIG.5D
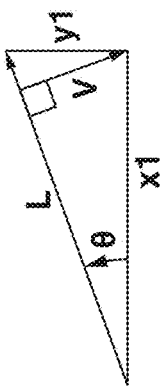
CAMERA SHAKE VECTOR (x1, y1) IN UPPER-RIGHT DIRECTION OF SCREEN
θ REPRESENTS CAMERA MOVEMENT DIRECTION.
V REPRESENTS PREDETERMINED CORRECTION DIRECTION.

APPARATUS, METHOD, AND STORAGE MEDIA

BACKGROUND

Technical Field

The aspect of the embodiments relates to an apparatus that controls correction of image blur on an object.

Description of the Related Art

Image blur that occurs on an image of a captured object include camera shake caused due to a movement of an image capturing apparatus such as camera shake, and image blur caused due to a motion of an object. To provide a stable composition by correcting image blur and tracking an object (main object) intended by a user, it may be desirable to identify the main object and detect a motion of the main object that is separated from a motion of another object such as a background.

It may be also desirable to correct the image blur such that the main object can be located at substantially the same position on a screen.

Japanese Patent Application Laid-Open No. 2019-95630 discusses a technique of image blur correction during image capturing of panning Specifically, if it is determined that panning is being performed, an ideal angular velocity for panning (reference panning angular velocity) is calculated and image blur is corrected, during exposure, based on the difference between the reference panning angular velocity and the detected angular velocity of an image capturing apparatus. It is thereby possible to correct image blur that occurs on an object, while maintaining the effect of panning to cause the background of the object to flow.

In the technique discussed in Japanese Patent Application Laid-Open No. 2019-95630, however, a photograph to be taken by panning is an image capturing target and an intentional change of the object is not taken into consideration. Thus, it may be difficult to apply this technique to image blur correction when the user intentionally changes the main object during live view display, moving image recording, or continuous shooting.

SUMMARY

According to an aspect of the embodiments, an apparatus includes an object detection unit configured to detect a main object, a first motion detection unit configured to detect a motion vector of the main object, a second motion detection unit configured to detect a movement of a capturing apparatus, a first acquisition unit configured to acquire a first blur correction amount to correct image blur on the main object based on the detected motion vector of the main object, a second acquisition unit configured to acquire a second blur correction amount to correct a shake of the capturing apparatus based on the detected movement of the capturing apparatus, a control unit configured to control a correction unit based on at least one of the first blur correction amount and the second blur correction amount, and a determination unit configured to determine whether the main object is changed between a first timing when a first image is captured and a second timing when a second image is captured. In a case where the determination unit determines that the main object is changed, the control unit changes a control from image blur correction based on the first blur correction amount to image blur correction based on the second blur correction amount.

Other aspects of the disclosure will be apparent from the following exemplary embodiments.

Further features of the disclosure will become apparent from the following description of exemplary embodiments with reference to the attached drawings.

BRIEF DESCRIPTION OF THE DRAWINGS

FIGS. 5A to 5D are explanatory diagrams each illustrating setting of a vector detection frame according to the first exemplary embodiment.

DESCRIPTION OF THE EMBODIMENTS

Figure 1:
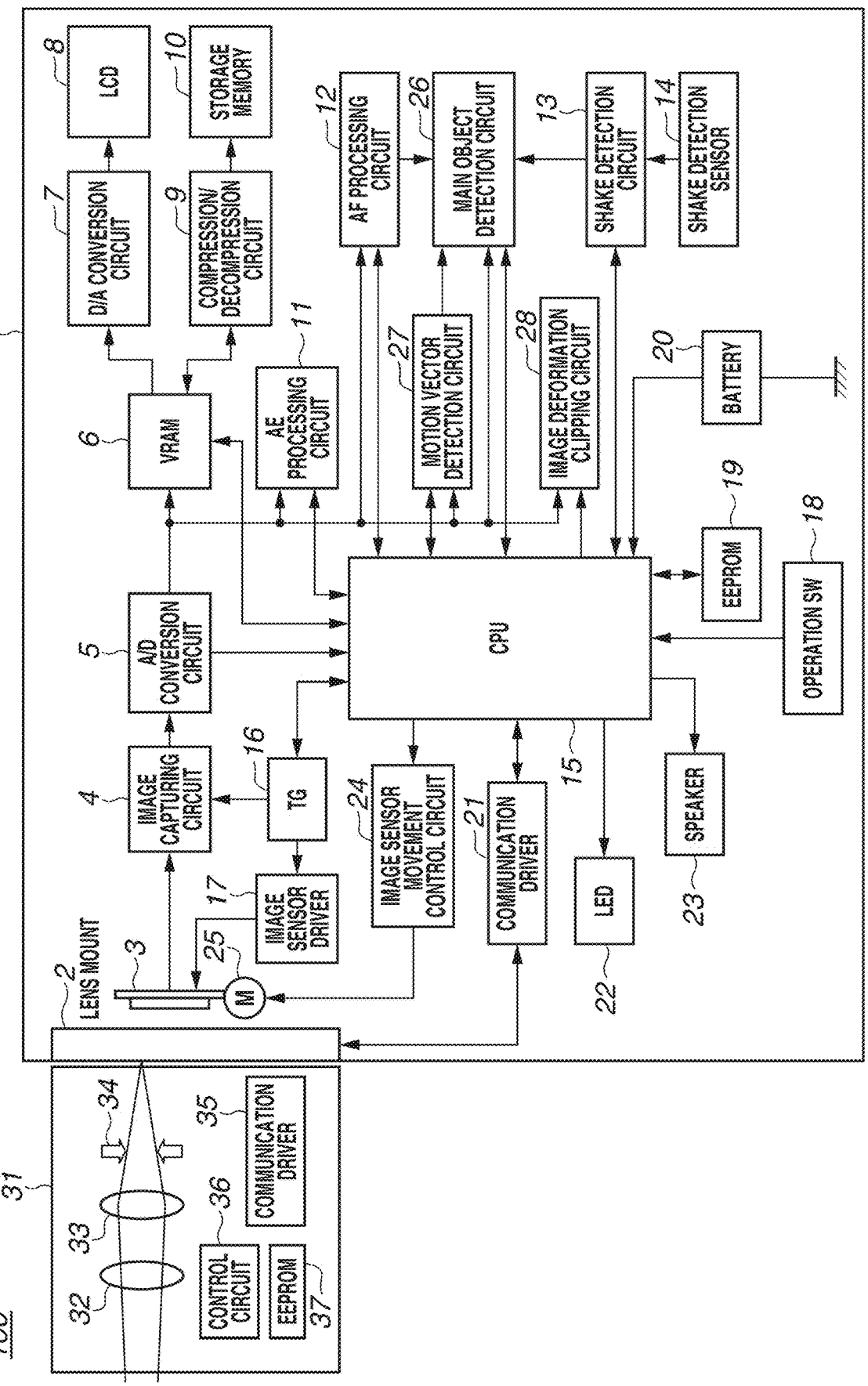
FIG. 1 is a block diagram illustrating an image capturing system according to a first exemplary embodiment.

Exemplary embodiments of the disclosure will be described in detail below with reference to the drawings. The following exemplary embodiments are not meant to limit the scope of the disclosure as encompassed by the appended claims. A plurality of features is described in the exemplary embodiments, but not all of the features described are essential to the solution of the disclosure. The features may also be combined as appropriate. In the accompanying drawings, the identical or like components are denoted by like reference numerals, and repeated descriptions are omitted.

First Exemplary Embodiment

In the exemplary embodiment, an image blur correction method for providing a smooth video image even when a main object is changed, and an image blur correction apparatus for executing the image blur correction method will be described.

FIG. 1 is a block diagram illustrating a configuration of an image capturing apparatus according to a first exemplary embodiment of the disclosure. As illustrated in FIG. 1, an image capturing system 100 has a configuration in which an interchangeable lens 31 is detachably attached to an image capturing apparatus body (hereinafter referred to as an image capturing apparatus) 1.

Each component of the image capturing apparatus 1 will be described. In the image capturing apparatus 1, a lens mount 2 is disposed to attach the interchangeable lens 31. An image sensor 3 can be composed of a complementary metal-oxide semiconductor (CMOS) sensor or a charge-coupled device (CCD) sensor. Light transmitted through an image capturing optical system in the interchangeable lens 31 is formed as an object image, and the image sensor 3 photoelectrically converts the formed object image. An image capturing circuit 4 generates a predetermined captured image signal (hereinafter referred to as an image signal) by performing various image processing on an electrical signal photoelectrically converted by the image sensor 3. An analog-to-digital (A/D) conversion circuit 5 converts an analog image signal generated by the image capturing circuit 4 into a digital image signal (image data). A video random access memory (VRAM) 6 composed of a buffer memory or the like receives an output from the A/D conversion circuit 5 and temporarily stores the image signal. A digital-to-analog (D/A) conversion circuit 7 reads out the image data stored in the VRAM 6, and converts the image signal into an analog signal in a form suitable for playback output. An image display device, such as a liquid crystal display device (LCD), displays the image signal. The image display device will hereinafter be referred to as an LCD 8. A storage memory 10 is composed of a semiconductor memory or the like, and stores the image data.

A compression/decompression circuit 9 includes a compression circuit and a decompression circuit. The compression circuit reads out the image signal temporarily stored in the VRAM 6 and performs compression processing and encoding processing on image data to convert the image signal into a form suitable for storage in the storage memory 10. The decompression circuit performs, for example, decoding processing and decompression processing, to convert the image signal stored in the storage memory 10 into a form suitable for playback display or the like. An automatic exposure (AE) processing circuit 11 receives the output from the A/D conversion circuit 5 and performs AE processing. An autofocus (AF) processing circuit 12 receives the output from the A/D conversion circuit 5, generates an AF evaluation value for performing AF adjustment processing, and further detects a defocus amount.

A shake detection sensor 14 detects a motion, such as a camera shake, of the image capturing system 100. The shake detection sensor 14 can be composed of an inertia sensor such as a gyroscope sensor or an accelerometer. Using a plurality of shake detection sensors 14 enables detection of a multi-axial shake. A shake detection circuit 13 processes a signal from the shake detection sensor 14. A central processing unit (CPU) 15 is a microcomputer having a built-in arithmetic operation memory for controlling the overall operation of the image capturing system 100. A timing generator (TG) 16 generates a predetermined timing signal. An image sensor driver 17 controls driving of the image sensor 3. An operation switch 18 is a group of various switches. The operation switch 18 includes a main power switch for starting the image capturing apparatus 1 and supplying power, a recording start switch for starting a moving image capturing operation (moving image recording operation), and a release switch for starting a still image capturing operation (still image recording operation). The operation switch 18 further includes a playback switch for starting a playback operation, an exposure correction amount change dial, an exposure time change dial, and an aperture value change dial. The release switch is composed of a two-stage switch having a first stroke (SW1) and a second stroke (SW2). When SW1 is turned on, an instruction signal for starting AE processing and AF processing to be performed prior to an image capturing operation is generated. When SW2 is turned on, an instruction signal for starting an actual exposure operation is generated.

An electrically erasable programmable read-only memory (EEPROM) 19 stores programs for performing various control operations, data used to perform various operations, and the like in advance. A battery 20 is a power supply that supplies power to the entire image capturing system 100. A communication driver 21 is a circuit for the image capturing apparatus 1 to communicate with the interchangeable lens 31. A light-emitting diode (LED) 22 is a display element for performing a warning display or the like. An image sensor movement motor 25 is a driving source (actuator) for moving sensors in horizontal and vertical rotation directions. An image sensor movement control circuit 24 controls the movement of the image sensor 3 using the image sensor movement motor 25. A motion vector detection circuit 27 receives the output from the A/D conversion circuit 5 and performs processing for detecting a motion vector of an object. A main object detection circuit 26 receives an output from each of the motion vector detection circuit 27, the A/D conversion circuit 5, and the CPU 15, and performs main object detection processing. An image deformation clipping circuit 28 performs image processing such as rotation, scaling, and trimming of a captured image. A speaker 23 is a sound source for performing an in-focus notification, an out-of-focus warning, or the like.

Each component of the interchangeable lens 31 will now be described. In the interchangeable lens 31, an image blur correction lens 32 is an optical element for moving an object image on an image plane of the imaging sensor 3 to correct image blur. The image blur correction lens 32 is moved on an xy plane vertical to an optical axis, thereby allowing the object image to move. A focus lens 33 is an optical element for focusing by adjusting an image forming position in the optical axis direction of the object image. An aperture 34 is a light amount adjustment unit that controls the amount of light flux transmitted through an optical image capturing system composed of the image blur correction lens 32, the focus lens 33, and the like. A communication driver 35 is a circuit for the interchangeable lens 31 to communicate with the image capturing apparatus 1. A control circuit 36 controls an aperture drive motor (not illustrated) for driving the aperture 34, a focus drive motor (not illustrated) for driving the focus lens 33, and an image blur correction lens drive motor (not illustrated) for driving the image blur correction lens 32. An EEPROM 37 is an electrically rewritable read-only memory that stores data for performing various control operations and the like in advance.

The storage memory 10 is a storage medium for storing image data and the like. A fixed-type semiconductor memory, such as a flash memory, or a semiconductor memory, such as a card type flash memory having a card shape or a stick shape that is detachably attached to various devices, can be used as the storage memory 10. Alternatively, various types of storage media, including a magnetic storage medium such as a hard disk or a Floppy® disk, can be applied.

An operation of the image capturing system 100 according to the present exemplary embodiment that is configured as described above will now be described.

Light flux from the object, which has been transmitted through the interchangeable lens 31 and whose light amount has been adjusted, is formed on a light-receiving surface of the image sensor 3. This object image is converted into an electrical signal through photoelectric conversion processing by the image sensor 3, and is then output to the image capturing circuit 4. The image capturing circuit 4 performs various signal processing on the input signal, thereby generating a predetermined image signal. This image signal is output to the A/D conversion circuit 5 and converted into a digital signal (image data), and is then temporarily stored in the VRAM 6. The image data stored in the VRAM 6 is output to the D/A conversion circuit 7 and is converted into an analog signal suitable for display. The analog signal is then displayed as an image on the LCD 8 (live view display).

The image data stored in the VRAM 6 is also output to the compression/decompression circuit 9. The compression circuit in the compression/decompression circuit 9 performs compression processing on the image data. Thereafter, the image data is converted into a data form suitable for storage and stored in the storage memory 10.

For example, when the playback switch (not illustrated) in the operation switch 18 is operated and turned on, the playback operation is started. The image data stored in a compressed form in the storage memory 10 is then output to the compression/decompression circuit 9, and the decompression circuit performs decoding processing, decompression processing, or the like on the image data. Thereafter, the image data is output to the VRAM 6 and is temporarily stored. The image data is also output to the D/A conversion circuit 7 and is converted into an analog image signal suitable for display. The analog image signal is then displayed as an image on the LCD 8.

The predetermined timing signal is output from the TG 16 to the CPU 15, the image capturing circuit 4, and the image sensor driver 17. The CPU 15 performs various control operations in synchronization with the timing signal. The image capturing circuit 4 receives the timing signal from the TG 16, and performs various image processing, such as color signal separation, in synchronization with the timing signal. The image sensor driver 17 receives the timing signal from the TG 16 and drives the image sensor 3 in synchronization with the timing signal to acquire the image signal.

The digital image data converted by the A/D conversion circuit 5 is also output to the AE processing circuit 11, the AF processing circuit 12, the motion vector detection circuit 27, the main object detection circuit 26, and the image deformation clipping circuit 28, separately from the VRAM 6 described above.

The AE processing circuit 11 receives the input digital image signal and performs calculation processing, such as cumulative addition, on a brightness value of image data corresponding to one screen. An AE evaluation value corresponding to the brightness of the object is thereby calculated, and the AE evaluation value is output to the CPU 15. The CPU 15 calculates an exposure time of the image sensor 3 and an aperture value of the aperture 34 based on the input AE evaluation value, and transmits the information to the interchangeable lens 31 through the communication driver 21. Based on the information, the interchangeable lens 31 performs aperture driving processing and the like so that the aperture amount of the aperture 34 can be appropriately adjusted.

The AF processing circuit 12 performs an image correction on the image signal acquired by the image sensor 3 including image capturing pixels for focus adjustment, and performs a correlation calculation using the corrected image signal, thereby detecting the defocus amount. The image capturing pixels for focus adjustment are composed of a pair of image capturing pixels designed to receive a light beam from a first area of an exit pupil of an optical system and a light beam from a second area of the exit pupil of an optical system different from the optical system. The AF processing circuit 12 performs an image correction of a base image (A-image) formed of an output signal from the image capturing pixel that receives the light beam from the first area and a reference image (B-image) formed of an output signal from the image capturing pixel that receives the light beam from the second area. Thereafter, the correlation between the A-image and the B-image is calculated, and the defocus amount is calculated by multiplying a conversion factor (K-value) by the obtained amount of image deviation between the A-image and the B-image. This enables imaging plane phase difference AF.

The CPU 15 obtains the driving amount and the driving direction of the focus lens 33, and transmits the acquired information to the interchangeable lens 31 through the communication driver 21. The interchangeable lens 31 performs driving processing on the focus lens 33, thereby enabling AF control to obtain an in-focus state.

The motion vector detection circuit 27 receives the input digital image signal (base image), and calculates the correlation between the input digital image signal and the digital image signal (reference image) in a preceding frame in accordance with areas divided in response to an instruction from the CPU 15. The motion vector of the object in each of the divided areas is thereby obtained.

Specifically, a pixel shifting amount having a highest degree of correlation (minimum amount of difference) obtained as a result of calculating the difference between the base image and the reference image while shifting the reference image by a predetermined number of pixels in the horizontal and vertical directions is set as a motion amount of the object in the area. In this case, the direction in which the reference image is horizontally and vertically shifted by the predetermined number of pixels is set as a motion direction. Thus, the motion vector of the object in the area between frames can be obtained. A method for obtaining the motion vector is discussed in, for example, Japanese Patent No. 3143173, and thus the detailed description thereof is omitted.

The main object detection circuit 26 functions as a main object detection unit, and detects the position of the main object on the screen as described below. A method for detecting a main object area will be described in detail below with reference to a flowchart illustrated in FIG. 2, and thus an outline of the method will be described here.

First, it is determined whether a main object area has been designated by a user. For example, an area where an AF point is designated by the user, or an area where a touch operation is performed by the user for a predetermined period when a touch panel is mounted on the LCD 8 is determined to be the main object area.

In response to the output from the A/D conversion circuit 5, portions characterizing a face, such as pupils and eyebrows, are searched on an image. Based on the positional relationship between the portions, the position of the face of a person is detected on the image. Further, the size of the face, the tilt of the face, and the like are obtained based on the positional relationship between the portions characterizing the face, such as the interval between the portions, and the detected face area is set as a candidate for the main object area. Further, in response to the output from the A/D conversion circuit 5, portion having shapes respectively corresponding to the portions characterizing a person, such as the head and body of the person, are searched on the image and the positional relationship between the portions is evaluated to thereby detect the position of the person on the screen. For example, it may be desirable to determine that a person exists in a case where a shape similar to a circular shape is detected, a first rectangular shape is present at a lower portion of the circular shape, and a second rectangular shape having short sides that are shorter than those of the first rectangular shape is adjacent to the first rectangular shape. The area where the detected person is present is also set as a candidate for the main object area.

In response to the output from the A/D conversion circuit 5, a group of similar colors or brightnesses is detected and the size and position of the group on the screen are detected, thereby estimating the degree of the main object based on the detection result. For example, if a group of similar colors and brightnesses with a size more than or equal to a predetermined size is present at a position near the center of the screen, the group is determined to be a candidate for the main object. Among the areas whose size and position on the screen satisfy predetermined conditions, an area with the highest degree of the main object obtained based on the coordinates of the center of gravity with the center of the screen as the origin and the size of the group is set as the main object area. Assume that the degree of the main object increases as the coordinates of the center of gravity are closer to the center, or as the size of the group increases.

The distance or defocus amount at each AF point within the screen is acquired from the processing result of the AF processing circuit 12. A moving object to be captured by the user on the screen is detected using the processing result of the motion vector detection circuit 27 and the result of the shake detection circuit 13. The term "moving object" used herein does not refer to an object moving on an image, but refers to an object moving in the real space.

Information, such as the processing result of the AE processing circuit 11, AF point information set by the user including settings made by touching an LCD screen, an image capturing mode, a shutter speed, and an aperture value, is acquired from the CPU 15.

The main object detection circuit 26 detects a plurality of main object areas in a comprehensive fashion from the detection result obtained as described above, and transmits the result of prioritizing the main object areas to the CPU 15.

Figure 2:
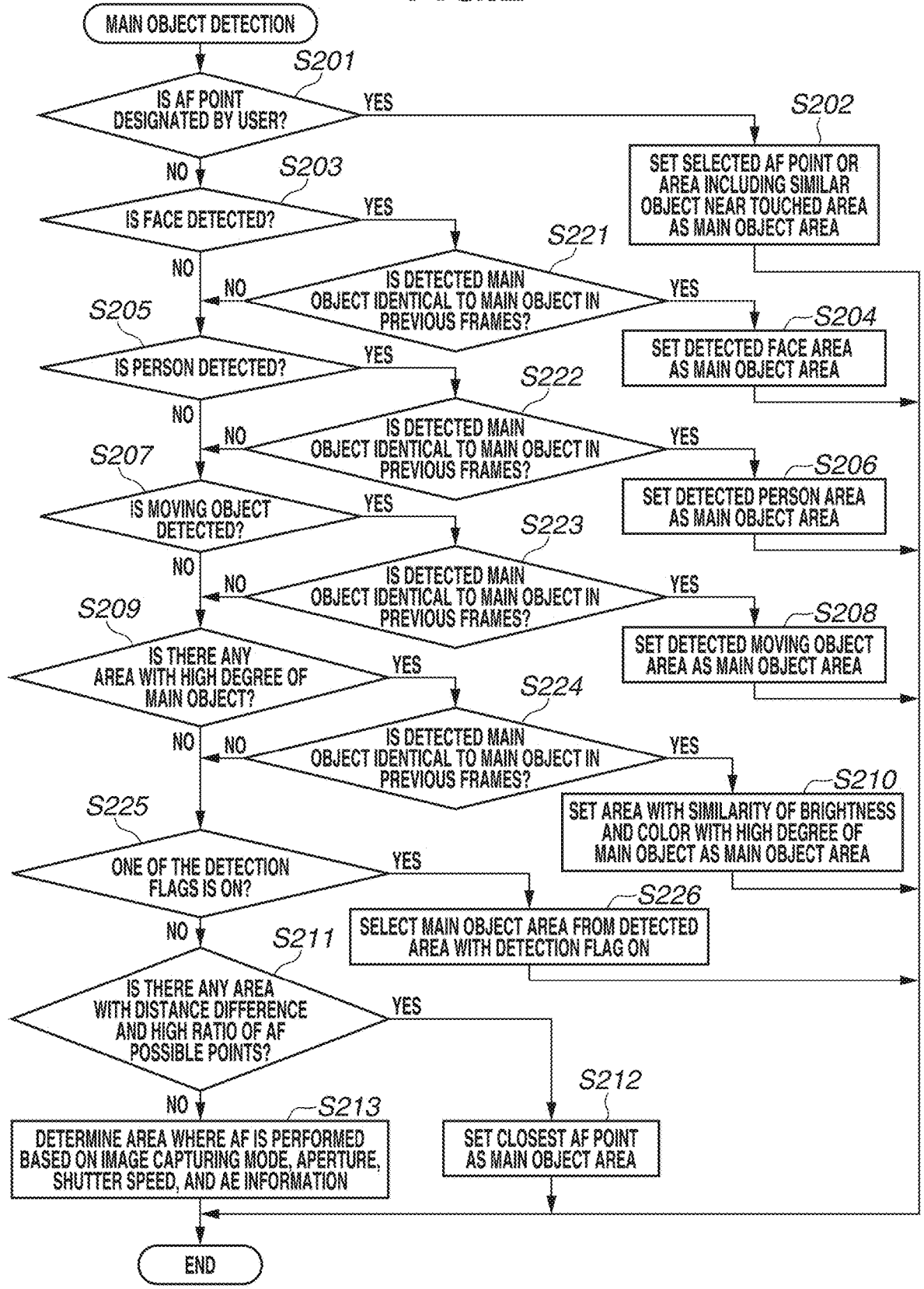
FIG. 2 is a flowchart illustrating a main object detection operation procedure according to the first exemplary embodiment.

A specific procedure for detecting the main object by the main object detection circuit 26 will be described with reference to FIG. 2. In this procedure, a main object detected earlier has a higher priority.

When the main object detection processing is started, the main object detection circuit 26 first turns off all main object detection flags. Thereafter, in step S201, it is determined whether a main object area is designated by a user. This step is executed by checking the AF point information sent from the CPU 15 and determining whether any AF point is designated through, for example, a touch operation on a menu or the LCD screen by the user. If no AF point is designated (YES in step S201), the processing proceeds to step S202.

In step S202, if any AF point is designated on a menu or the like, the AF point is set as the main object area. If no AF point is designated and the main object intended by the user is selected by touching the LCD screen, the area and an area where a similar object is present in the vicinity of the area are set as the main object area.

For example, it is determined whether face detection or the like is performed on the selected area that is closest to the center of the selected area. The size of an area to be selected by touching may be determined in advance. The size of the area may be varied depending on the focal length of the interchangeable lens 31.

If the detected face is present within the predetermined area, the main object area is determined based on the central coordinates and size of the detected face. If a plurality of faces or parts of the faces are detected within the predetermined area, the detected face whose center coordinates are close to the center of the predetermined area is selected. If two or more faces are located at the same distance, a larger face is selected. If two or more faces having the same size are detected, a face having been detected earlier is selected. If the detected face is large and the pupils can be detected, the area having two pupils or the area having a large pupil is set as the main object area.

In step S203, it is checked whether a face is detected. If a face is detected (YES in step S203), a face detection flag is turned on, and the processing proceeds to step S221. In step S221, it is determined whether the detected face is identical to the main object in the previous frames. If the detected face is identical to the main object (YES in step S221), the processing proceeds to step S204. In step S204, the detected face area is set as the main object area. If the detected face is not identical to the main object (NO in step S221), the processing proceeds to step S205. The determination will be described below as to whether the detected face is identical to the main object is made by using the "function of tracking the object estimated to be identical" of the main object detection circuit 26.

In step S205, it is checked whether a person is detected. If a person is detected (YES in step S205), a person detection flag is turned on, and the processing proceeds to step S222. In step S222, it is determined whether the detected person is identical to the main object in the previous frames. If the detected person is identical to the main object in the previous frames (YES in step S222), the processing proceeds to step S206. In step S206, the area of the detected person is set as the main object area. If the detected person is not identical to the main object in the previous frames (NO in step S222), the processing proceeds to step S207. The determination as to whether the detected person is identical to the main object in the previous frame is made using the "function of tracking the object estimated to be identical", similarly to step S221.

In step S207, it is checked whether there is a moving object. If there is a moving object (YES in step S207), a moving object detection flag is turned on, and the processing proceeds to step S223. In step S223, it is determined whether the detected moving object is identical to the main object in the previous frames. If the detected moving object is identical to the main object in the previous frames (YES in step S223), the processing proceeds to step S208. In step S208, the area of the moving object is set as the main object area. If the detected moving object is not identical to the main object in the previous frames (NO in step S223), the processing proceeds to step S209. The determination as to whether the detected moving object is identical to the main object in the previous frame is made using the "function of tracking the object estimated to be identical", similarly to step S221.

The determination as to whether there is a moving object is made using an output from the shake detection circuit 13, an output from the motion vector detection circuit 27, and an output from the AF processing circuit 12. When the output from the shake detection circuit 13 is small, or specifically when the user is not performing an operation to intentionally move the image capturing apparatus 1 (so-called panning operation), it is determined whether there is any area where the motion amount of the motion vector detected by the motion vector detection circuit 27 is more than or equal to a predetermined value. The case where the output from the shake detection circuit 13 is small indicates a case where all detected values on multiple axes are less than the predetermined value. If there is any area where the motion amount of the motion vector is more than or equal to the predetermined value, the area is set as a moving object area. The motion amount of the motion vector can be obtained by calculating the square root of the sum of the square value of the motion vector in the horizontal direction and the square value of the motion vector in the vertical direction.

When the output from the shake detection circuit 13 is large (when any one of the detected values on the multiple axes is more than or equal to the predetermined value), or specifically when the user is intentionally moving the image capturing apparatus 1, an area with a motion substantially equal to this intentional motion is set as the main object area. Specifically, if there is an area where the motion amount of the motion vector detected by the motion vector detection circuit 27 is less than or equal to the predetermined value, the area is set as the moving object area. If an image is divided into a plurality of areas and the motion amount of the motion vector in each of the detected areas is less than or equal to the predetermined value, the area is determined to be the area including the moving object tracked by the user. If the areas where the motion amount is less than or equal to the predetermined value are adjacent to each other, the areas are combined together. If there is a plurality of areas where the motion amount of the motion vector detected by the motion vector detection circuit 27 is less than or equal to the predetermined value, an area located near the center of the screen is selected as the area of the moving object.

If no moving object is detected in the processing using the output from the motion vector detection circuit 27, it is determined whether there is a moving object that moves in a distance direction (optical axis direction). This determination is made by determining whether there is an AF point whose amount is changing in the same direction in time series from the distance or defocus amount obtained from the AF processing circuit 12 (e.g., an AF point where the distance is approaching in five consecutive frames). A change in the distance or defocus amount in each frame with respect to all AF points obtained from the AF processing circuit 12 is checked, and the AF points that are changing by a predetermined amount in the same direction over a predetermined number of frames or more is extracted. The AF points are set as areas where a moving body is present, and if these areas are adjacent to each other, the areas are combined together. If there is a plurality of AF point areas that are changing in the same direction by a predetermined amount over a predetermined number of frames or more, an AF point area close to the center of the screen is selected as the moving object area.

In step S209, it is checked whether there is any area that has a high degree of the main object and can be regarded as the main object area in a group of similar colors or brightnesses. If there is such an area (YES in step S209), the main object detection flag is turned on, and the processing proceeds to step S224. In step S224, it is determined whether the main object included in the main object area is identical to the main object in the previous frame. If the detected main object is identical to the main object in the previous frames (YES in step S224), the processing proceeds to step S210. In step S210, the area is set as the main object area. If the detected main object is not identical to the main object in the previous frames (NO in step S224), the processing proceeds to step S225. The determination as to whether the detected main object is identical to the main object in the previous frame is made using the "function of tracking the object estimated to be identical", similarly to step S221.

The degree of the main object is determined based on the position and size of a group of similar colors or brightnesses on the screen. The detected groups that are not in contact with two of the four sides of the screen are selected, and the group selected from among the groups having a size larger than or equal to a predetermined size is regarded as a group having a high degree of the main object. If there is a plurality of corresponding groups, the group whose center of gravity position is close to the center of the screen is selected.

In step S225, it is determined whether a candidate for the main object is detected in the previous processing by checking the detection flags. If any one of the detection flags is on (YES in step S225), it is determined that the candidate for the main object is detected, and the processing proceeds to step S226.

In step S226, an area having the highest priority is selected from the detected areas for which the detection flag is turned on, and the area is set as the main object area. As described above, the priority order matches the order of detection in this processing flow. Specifically, if a face is detected, the face detected area is set as the main object area, and if no face is detected and a person is detected, the person detected area is set as the main object area. If neither faces nor persons are detected and a moving object is detected, the moving object area is set as the main object area. If none of these objects are detected, the detected area determined to have a high degree of the main object is set as the main object area. Even in a case where any object is detected in a first frame, the result of the determination whether the detected face is identical to the main object (e.g., step S221) becomes "NO", and the processing proceeds to step 226. If a candidate for the main object is detected, an area with a high priority is set as the main object area in step 226.

In step S225, if the detection flag is not on (NO in step S225), no candidate for the main object is detected in the previous processing, and thus the processing proceeds to step S211. In step S211, it is determined whether there is an object with a distance difference and a high ratio of AF possible points within the screen based on the processing result of the AF processing circuit 12. If the condition is satisfied, the processing proceeds to step S212. In step S212, an AF point indicating the closest AF result among the plurality of AF points is set as the main object area. In this case, it can be considered that, for example, a ceremonial image capturing is performed by setting a landscape as a background instead of setting the entire screen as the object, unlike in landscape image capturing. Accordingly, the closest object is set as the main object area. If the condition is not satisfied (NO in step S211), the processing proceeds to step S213. In step S213, the main object area is determined based on the AE processing result acquired from the CPU 15, the image capturing mode, the shutter speed, the aperture value, and flash ON/OFF information set by the user.

The processing of step S213 will now be described. First, the main object area is determined as illustrated in the following table based on the image capturing mode.

TABLE 1

| Image Capturing Mode | Associated Condition | Main Object Area |
|---|---|---|
| Landscape Mode | None | Center 60% × 60% Area |
| Aperture Priority Mode | Aperture value is narrowed by a predetermined value | Center 60% × 60% Area |
| Shutter Speed Priority Mode | Shutter speed is higher than a predetermined speed | Center 20% × 20% Area |

When the above-described conditions are not satisfied, the main object area is determined as illustrated in the following table.

TABLE 2

| Brightness | Associated Condition | Main Object Area |
| --- | --- | --- |
| Bv value < predetermined Bv value | Flash forced ON | Center 20% × 20% Area |
| Bv value < predetermined Bv value | Flash auto, OFF | Center 60% × 60% Area |
| Bv value ≥ predetermined Bv value | None | Center 20% × 20% Area |

The main object detection circuit 26 has the function of tracking the object estimated to be identical to the object detected as the main object in the previous frame. If the object detected as the main object in the above-described procedure is estimated to be identical to the main object in the previous frame according to the function, the object is set as the main object with the highest priority. As illustrated in the flowchart of FIG. 2, even if there is a main object that has been detected earlier, the main object estimated to be identical is selected in the above-described procedure. Specifically, even in a case where it is determined that a face is detected, if the face is not identical to the object and a person is detected and it is determined that the person is identical to the object, the person is set as the main object with the highest priority. However, assume that a case is excluded where an AF point is designated on a menu or the like so that the user can explicitly designate the main object, and that a selected area or an area near the selected area is set as the main object area regardless of whether the object is identical to the object detected as the main object in the previous frame. Accordingly, it is determined that a new main object (second main object) is detected in the following two cases. In the first case, the user explicitly designates the main object. In the second case, the main object is not estimated to be identical to the main object in the previous frame and another main object with a high priority is detected at the same time, for example, in a case where, when a first main object greatly moves, the user does not intentionally track the first main object and the position of the first main object on the screen has changed to a large extent.

Next, the "function of tracking the object estimated to be identical" to the object detected as the main object in the previous frame will be described. The method of estimating the identical object varies depending on which of the above described conditions the main object area is detected.

If any AF point is designated by the user, an area including the AF point is always set as the main object area. In other words, the object intentionally designated by the user is set as the main object, without estimating whether the object is identical. In this case, however, there is a possibility that the main object may temporarily move to the adjacent AF point. Accordingly, AF information about vertically and horizontally adjacent AF points is also acquired. If the AF information about the designated AF point greatly varies and substantially the same AF information is obtained at the adjacent AF point, the adjacent AF point is set as the main object area.

If the main object area is determined depending on the face detection result or the person detection result, the following processing is performed. That is, a face or a person is detected, and if a face or person having substantially the same size as that of the detected face or person is located at a position similar to the position in the previous frame (the difference in central coordinates indicated by the detection result is within a predetermined value), it is estimated that the detected face or person is identical to the object in the previous frame, and the newly detected area is set as the main object area.

If a moving object is set as the main object area, the area of the moving object is detected in the above-described procedure and the main object area is selected based on the detected position (central coordinates of the area) and the motion vector of the area. If the position and motion vector of the detected moving object area are similar to those detected in the previous frame, it is estimated that the detected moving object is identical to the object in the previous frame, and the newly detected area is set as the main object area. As for the moving object in the distance direction, if the position and motion vector of the newly detected moving object area are similar to those detected in the previous frame, it is estimated that the detected moving object is identical to the object in the previous frame, and the newly detected area is set as the main object area.

A quadratic function approximation may be performed based on a motion vector (a motion amount and a direction) between several frames to estimate the motion of the object. If the difference between the motion amount obtained based on the motion vector with respect to the estimated motion amount is within a predetermined value, it may be estimated that the object is identical and the area may be set as the main object area.

Also, in a case where an area with a high degree of the main object in a group of similar colors and brightnesses is set as the main object area, if the size and position of a newly detected group of similar colors and brightnesses are similar to those detected in the previous frame, it is estimated that the detected object is identical to the object in the previous frame. The newly detected area is set as the main object area.

If the closest object is set as the main object area (step S212 in FIG. 2), a new main object area is searched without determining whether the object is estimated to be identical.

If any one of recording stop, panning (including tilting) with an angle exceeding an angle of view, extremely large brightness change, change to the playback mode, power off, and the like is performed, it is determined that the preceding image capturing processing on the main object is completed once. Then, the main object area information previously detected is deleted.

The image deformation clipping circuit 28 corrects a change in information about vertical and horizontal motions of the main object on the image calculated by the CPU 15 and the rotation of the image capturing apparatus 1 depending on the information, based on the output from the main object detection circuit 26 and the motion vector detection circuit 27. This correction processing is so-called electronic image blur correction to be performed by image processing, including deformation such as image rotation, and clipping of a part of an image.

For example, the position of the face of a person detected as the main object on the screen can greatly vary due to a movement of the person or camera shake of the user, or the main object can move obliquely. If such shake occurs between frames of a moving image, or if the main object moves in the horizontal, vertical, or oblique directions on the screen, a situation where the main object is not located at the position on the screen desired by the user, or an unnatural movement of the main object occurs. If such a phenomenon frequently occurs between frames, it is extremely uncomfortable for the user to see the recorded moving image.

Accordingly, in the present exemplary embodiment, the motion vector detection circuit 27 detects the motion vector representing the movement of the main object in the horizontal and vertical directions between frames, and the CPU 15 calculates information for correcting an image (hereinafter referred to as a correction amount) based on the detected motion vector. The image deformation clipping circuit 28 performs deformation and correction processing on the image depending on the calculated correction amount, and records the corrected image in a predetermined area of the VRAM 6, thereby performing electronic image blur correction.

In the present exemplary embodiment, the motion vector detection circuit 27 detects the motion vector of the main object detected by the main object detection circuit 26. Thereafter, blur occurring on the main object is corrected using the detected motion vector. If a plurality of candidates for the main object is detected, the main object candidate having the highest priority is set as the main object and object blur correction is performed to reduce blur on the main object in the image.

The amount of change in the position of the main object is then calculated based on an output from a main object area detection unit. If the amount of change is more than or equal to a predetermined amount, or if the difference between the motion of the image capturing apparatus and the motion of the main object calculated based on the motion vector and the inertia sensor is more than or equal to a predetermined value, it is determined that the main object is intentionally changed by the user, and the object blur correction is stopped, and in one embodiment, only camera shake correction in a predetermined direction is performed.

An actual image capturing operation of the image capturing system 100 according to the present exemplary embodiment will now be described with reference to a flowchart illustrated in FIG. 3.

When the main power switch of the image capturing apparatus 1 is on and the image capturing (recording) mode is set as the operation mode of the image capturing apparatus 1, an image capturing processing sequence is executed.

In step S301, processing, such as variable initialization and movement of a driving member to an initial position, is performed, and then it is determined whether the interchangeable lens 31 is attached. If the interchangeable lens 31 is attached, information about the image blur correction lens 32, the focus lens 33, and the aperture 34 is acquired.

If the interchangeable lens 31 is not attached, the processing proceeds to step S302 without performing the processing of acquiring the interchangeable lens information.

In step S302, the CPU 15 displays an object image that is transmitted through the interchangeable lens 31 and is formed on the image sensor 3 as an image on the LCD 8.

When a moving image recording mode is set and the blur correction setting is on, the image subjected to image blur correction processing may be displayed on the LCD 8.

In step S303, the CPU 15 checks which one of the moving image recording mode and a still image capturing mode is set. If the moving image recording mode is set (YES in step S303), the processing proceeds to step S304. If the still image capturing mode is set (NO in step S303), the processing proceeds to step S321.

In step S321, the state of the release switch is checked. If the user operates the release switch and the CPU 16 confirms that SW1 (first stroke of the release switch) is on (YES in step S321), the processing proceeds to step S322. In step S322, if the user makes a setting for performing image blur correction processing, camera shake correction processing is performed. In this processing, the shake detection sensor 14 detects a shake added to the image capturing system 100, and image blur correction processing (movement of at least one of the image blur correction lens and the image sensor) is performed based on the detection result. For example, image blur correction processing in still image capturing as discussed in Japanese Patent Application Laid-Open No. 5-161053 can be applied. Accordingly, the detailed description of this processing is omitted.

In step S323, AF processing and AE processing are performed and the focus lens 33 is driven to the in-focus position, and the aperture value, exposure time, and the like during still image capturing are determined. Then, the processing proceeds to step S324. In step S324, the AE processing result (e.g., warning of high brightness or low brightness) and the AF processing result (e.g., information indicating that AF is successful or unsuccessful) are superimposed on the object image formed on the image sensor 3, and are displayed as an image on the LCD 8. Additionally, lighting or blinking of the LED 22, generation of an in-focus sound or out-of-focus sound from the speaker, and the like may be used to provide a notification about the AE and AF processing results to the user.

In step S325, SW2 (second stroke of the release switch) is checked. If SW2 is on (YES in step S325), the processing proceeds to step S326. In step S326, the actual exposure processing is executed. If an image blur correction setting has been made by the user during the exposure processing, image blur correction processing is performed, similarly to step S322. After completion of the exposure processing, the processing proceeds to step S310. The term "exposure" used herein refers to image capturing processing (exposure) for capturing an image to be recorded, unless otherwise noted, and the exposure processing does not include image capturing processing for acquiring a live view image.

In step S303, if the moving image recording mode is set (YES in step S303), the processing proceeds to step S304. In step S304, the CPU 15 executes AF processing and AE processing, drives the focus lens 33 to the in-focus position, determines the aperture value and exposure time, and controls driving of the aperture 34 and the exposure time (accumulation time) of the image sensor 3.

In step S305, it is determined whether an image blur correction processing setting is made by the user. If the image blur correction processing setting is made (image stabilization (IS) is on) (YES in step S305), the processing proceeds to step S306. In step S306, image blur correction processing is performed. In contrast, if the image blur correction processing setting is not made (IS is off) (NO in step S305), the processing proceeds to step S307. The processing in step S306 will be described in detail below.

In step S307, the AE processing result (e.g., warning of high brightness or low brightness) and the AF processing result (e.g., information indicating that AF is successful or unsuccessful) are superimposed on the image to be displayed on the LCD 8. If the image blur correction processing setting is made, this image is a blur corrected image created in the processing of step S306. If the image blur correction processing setting is not made, this image is an image that is read out in step S302. Similarly to step S324, the notification about the AE processing result and the AF processing result can be provided to the user by a method other than the method of displaying the notification on the LCD 8.

In step S308, it is checked whether a moving image recording instruction has been made or input to the image capturing apparatus 1 by the user. If the moving image recording instruction is input (YES in step S308), the processing proceeds to step S309. In step S309, moving image recording processing is executed, and the processing proceeds to step S310. In the moving image recording processing of step S309, the blur corrected image created in the processing of step S306 is recorded if the image blur correction processing setting is made. If the moving image recording instruction is not input (NO in step S308), the processing proceeds to step S310.

In step S310, the state of the main power switch, the state of the playback switch, and whether replacement of a lens are checked. If any one of these states is executed (YES in step S310), the processing is terminated. In the other cases (NO in step S310), the processing returns to step S302.

Figure 4:
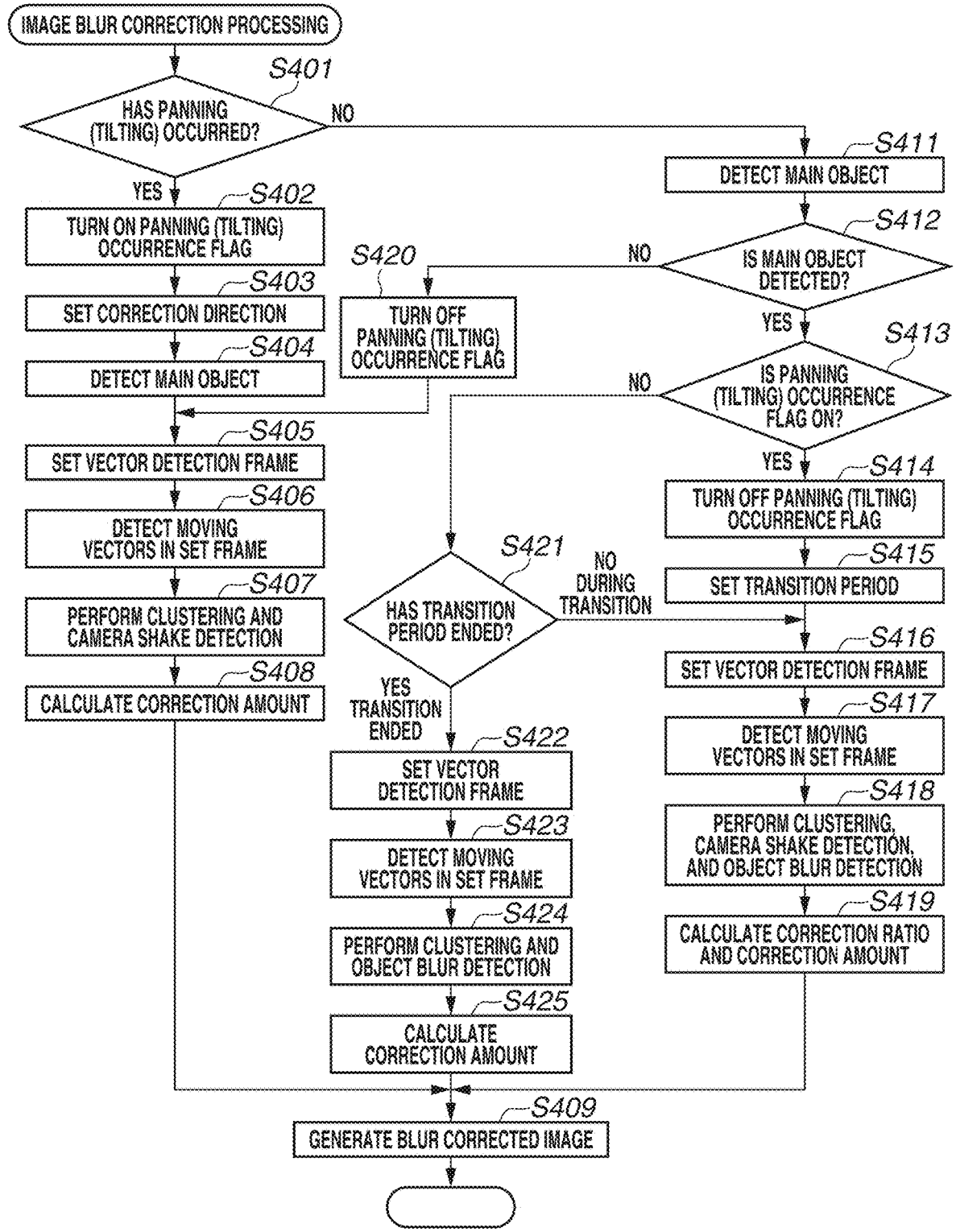
FIG. 4 is a flowchart illustrating an operation procedure for image blur correction processing according to the first exemplary embodiment.

The image blur correction processing performed in step S306 will now be described with reference to FIGS. 4 to 6B. FIG. 4 is a flowchart illustrating the image blur correction processing performed in step S306.

In step S401, the CPU 15 determines whether panning (including tilting) has occurred. Whether panning has occurred is determined based on an output from the main object detection circuit 26, an output from the motion vector detection circuit 27, and an output from the shake detection circuit 13. Specifically, based on the output from the main object detection circuit 26, the amount of change in the position of the main object from the previous frame (first image) to the current frame (second image) is calculated. If the amount of change is more than or equal to a first predetermined amount, it is determined that panning has occurred. A movement amount of the main object in the screen is also acquired based on the motion vector output from the motion vector detection circuit 27. If the movement amount is more than or equal to a second predetermined value, it is determined that panning has occurred. Furthermore, if the motion amount of the image capturing apparatus 1 output from the shake detection circuit 13 is more than or equal to a third predetermined value, it is determined that panning has occurred. It may be desirable to set the first to third predetermined values depending on the focal length of the interchangeable lens 31. For example, reference values of the first to third predetermined values are set for the focal length of 50 mm. When the focal length is in the range from 24 mm to 200 mm, the first to third predetermined values are set to be proportional to the focal length. When the focal length is less than 24 mm, the first to third predetermined values are set to the values equal to the values obtained when the focal length is 24 mm. When the focal length is more than 200 mm, the first to third predetermined values are set to the values equal to the values obtained when the focal length is 200 mm.

If it is determined that panning has occurred (YES in step S401), the processing proceeds to step S402. In step S402, the CPU 15 turns on a panning occurrence flag. Then, the processing proceeds to step S403.

Step S403 and subsequent steps relate to processing for correcting camera shake due to the motion of the image capturing apparatus 1 during a period in which panning is occurring. A camera shake is one of image blurs, and in one embodiment, only the camera shake is corrected in the direction orthogonal to the movement direction of the image capturing apparatus 1 during the panning.

In step S403, the CPU 15 sets the direction in which the camera shake is corrected. The movement direction (panning direction) of the image capturing apparatus 1 is obtained based on the shake amount in the pitch direction and the shake amount in the yaw direction that are output from the shake detection circuit 13. Further, the direction on the image sensor 3 that is orthogonal to the movement direction of the image capturing apparatus 1 is calculated, and the calculated direction is set as an image blur correction direction during occurrence of panning. Then, the processing proceeds to step S404.

In step S404, the CPU 15 causes the main object detection circuit 26 to detect a main object and acquires the position of the detected main object. The detection of the main object may be performed prior to step S404 immediately after the frame on which the processing is currently performed is acquired, and in one embodiment, only the detection result may be acquired in step S404.

In step S405, a vector detection frame is set. In step S405, the CPU 15 determines that the main object is present in step S404 (processing in the flowchart of FIG. 2). If the position of the main object can be acquired, the vector detection frame is set with a predetermined size in an area excluding the main object area. If it is determined that the main object is not present (if the AF area is determined in step S213 in the flowchart of FIG. 2), a predetermined number of vector detection frames are set with a predetermined size on the entire screen.

The CPU 15 sets the vector detection frame, for example, as illustrated in FIGS. 5A to 5D. If it is determined that the main object is present, the entire area of the screen is divided into a predetermined number (7×9 in this case) of blocks with a predetermined size and these blocks are set as illustrated in FIG. 5A. Among these blocks, blocks (white blocks illustrated in FIG. 5A) other than the blocks (grayed-out blocks illustrated in FIG. 5A) that partially overlap the area included in the main object area detected in step S404 are set as the vector detection frame.

On the other hand, if the CPU 15 determines that the main object is not present, a predetermined number (7×9 in this case) of vector detection frames with a predetermined size are set on the entire screen as illustrated in FIG. 5B.

In step S406, vectors in the frame set in step S405 are detected. In step S407, clustering for vector detection is performed and the vectors detected in the vector detection frame excluding the main object area are separated into vectors due to camera shake and vectors on which motion components due to the movement of the object itself are superimposed. Further, motion vectors due to camera shake are extracted from the separated vectors, thereby detecting a camera shake amount.

For example, as illustrated in FIG. 5C, if a part of the main object is present in the vicinity of a grayed-out portion near the center of the main object area, the direction and size of the vector detected in the vector detection frame are different from those of many of the vectors detected in the other vector detection frames. In the example illustrated in FIG. 5C, vectors in the left direction on the drawing sheet are detected in the vector detection frame where the moving main object is present, and vectors in the upper right direction on the drawing sheet are detected in the other vector detection frames. Accordingly, in step S407, vectors having a direction and size that are different from the other vectors by the reference value or more are excluded and the resultant vectors are averaged to thereby detect a camera shake.

After that, in step S408, the correction amount is calculated based on the camera shake detected in step S407. Thus, the correction amount (second blur correction amount) for correcting the image blur (i.e., camera shake) caused due to the movement of the image capturing apparatus 1 can be acquired. A method for acquiring the correction amount will now be described.

If the correction direction is set in step S403, in step 408, in one embodiment, the correction amount corresponding only to the shake amount in the set direction is acquired. For example, the camera shake acquired in step S407 corresponds to a vector L illustrated in FIG. 5C. When an angle formed between the vector L and an x-axis direction (horizontal direction on the drawing sheet) is represented by θ, a correction amount v obtained from the motion vector L is calculated by the following expression. A blur correction amount in the x-axis direction is represented by v(x), and a blur correction amount in the y-axis direction is represented by v(y).

$$|v|=L \cos \theta \sin \theta, L=\sqrt{(x1 \cdot x1+y1 \cdot y1)}$$

$$v(x)=|v|\cos \theta=L \cos \theta \sin \theta \cos \theta$$

$$v(y)=|v|\sin \theta=L \cos \theta \sin \theta \sin \theta$$

In a case where the processing proceeds to step S405 from step S420 and then proceeds to step S408 as described below, step S403 is skipped, and thus the shake correction direction is not set. In the case of correcting the camera shake in all directions, the shake detection sensor 14 and the shake detection circuit 13 detect the shake amount in the rotational direction (roll direction) of the image capturing apparatus 1, thereby acquiring an image rotation angle for correcting the rotational shake based on the detected value using a moving image capturing frame rate.

The term "all directions" used herein refers to all directions in which the camera shake can be corrected by an image blur correction unit. The acquired image rotation angle is a rotational angle with respect to the center of the screen, and the correction amount is acquired based on the image rotation angle and the camera shake (L) obtained in step S407. If the shake correction direction is not set, the shake amount in each of the pitch, yaw, and roll directions may be obtained from the shake detection circuit 13 and the blur correction amount may be acquired based on these shake amounts.

In step S409, the CPU 15 controls the image deformation clipping circuit 28 to perform image clipping based on the correction amount acquired in step S408, thereby generating a blur corrected image. In a case where the camera shake in all directions in which the camera shake can be corrected is corrected (when the processing proceeds to step S409 from step S420), a correction rotation angle for correcting the shake amount in the rotational direction of the image capturing apparatus 1 based on signals output from the shake detection sensor 14 and the shake detection circuit 13 is obtained. Then, the components are corrected (roll correction) by geometric deformation prior to clipping of an image. Since the size of the clipped image is constant, if a clipping range does not satisfy a predetermined size when the predetermined position is set as the main object position, the clipping range is adjusted to the predetermined size.

Accordingly, if panning has occurred, it is determined that the main object is intentionally changed by the user, and the camera shake that occurs in the captured image due to the movement of the image capturing apparatus 1 is corrected.

In step S401, if it is determined that panning has not occurred (NO in step S401), the processing proceeds to step S411. In step S411, the CPU 15 controls the main object detection circuit 26 to perform the main object detection in the flowchart illustrated in FIG. 2, and acquires information indicating whether the main object is detected from the output from the main object detection circuit 26. Then, the processing proceeds to step S412. In step S412, the CPU 15 determines whether the main object is detected based on the information acquired in step S411. If no main object is detected (NO in step S412), the processing proceeds to step S420. In step S420, the panning occurrence flag is turned off if the panning occurrence flag is turned on in step S402 on the previous frame. Then, the processing proceeds to step S405. The processing of step S405 and subsequent steps is described above.

In contrast, if the main object is detected in step S412 (YES in step S412), the processing proceeds to step S413. In step S413, it is determined whether the panning occurrence flag is on. If the panning occurrence flag is on (YES in step S413), the processing proceeds to step S414. In step S414, the panning occurrence flag is turned off, and the processing proceeds to step S415. If the panning occurrence flag is not on (NO in step S413), the processing proceeds to step S421.

The processing of step S415 and subsequent steps is processing that gradually transitions from the camera shake correction performed during occurrence of panning to the object blur correction (correction of the camera shake and a blur that occurs on the captured image due to the movement of the object). After the panning ends, the subsequent processing is performed before a lapse of a predetermined period. In step S415, a period for this transition (hereinafter referred to as a transition period) Tch is set. The processing proceeds to step S415 when panning occurs in the previous frames. Accordingly, it may be desirable to determine the transition period Tch based on the period in which panning that has occurred in the previous frames continuously occurs. For example, the transition period Tch is set to be equal to the period in which panning has occurred, thereby making it possible to obtain a smooth video image. However, in a case where the panning speed is high, if the period in which the panning has occurred is set as the transition period Tch, framing after panning can be made unstable. Therefore, a reference panning speed is determined in advance and if the speed of panning that has occurred exceeds the reference speed, a maximum value is set for the panning speed and the panning speed is set to be the proportional times the reference speed. The panning speed can be acquired from the absolute value of the value detected by the shake detection circuit 13. It may be desirable to determine the reference speed in view of the focal length. For example, the reference speed at the focal length of 50 mm is first determined, and when the focal length is in the range from 24 mm to 200 mm, the panning speed is set to be proportional to the reciprocal of the ratio of the focal length to the focal length of 50 mm. When the focal length is less than 24 mm, the same value as that of the reference speed at the focal length of 24 mm is set as the reference speed, and when the focal length exceeds 200 mm, the same value as that of the reference speed at the focal length of 200 mm is set as the reference speed.

In this case, the reference speed for the focal length of 100 mm is half of the value for the focal length of 50 mm, and the reference speed for the focal length of 25 mm is twice as much as the value for the focal length of 50 mm. In this case, the maximum value for the reference speed may be uniformly set regardless of the focal length, or may be determined for each focal length.

When the transition period Tch is set, the vector detection frame is set in step S416. In step S416, the vector detection frame is set for each of the main object area and areas other than the main object area. For example, the entire area of the screen is divided into a predetermined number of blocks with a predetermined size, and these blocks are set as illustrated in FIG. 5A. Among these blocks, blocks (grayed-out blocks illustrated in FIG. 5A) that partially overlap the area included in the main object area detected in step S404 are set as a detection frame for detecting an object vector. Blocks (white blocks illustrated in FIG. 5C) other than the grayed-out blocks are set as a background vector detection frame. The movement of the object is detected based on the object vector, and the movement of the image capturing apparatus 1 is detected based on a background vector.

In step S417, vectors in the vector detection frame set in step S416 are detected, and the processing proceeds to step S418. In step S418, clustering for vector detection is performed, and a camera shake amount and an object blur amount are detected. The method of detecting the camera shake amount is similar to that in step S407.

Vectors detected in the vector detection frame that does not overlap the main object area are separated into vectors due to camera shake and vectors due to the movement of the object itself, and motion vectors due to camera shake are extracted to thereby detect the camera shake amount.

The object blur amount is also detected by performing clustering. The vectors detected in the vector detection frame within the frame overlapping the main object area are separated into vectors including object motion components and vectors including no object motion components, and a main object motion vector including object motion components is extracted to thereby detect the object blur amount (camera shake amount+object motion amount).

For example, as illustrated in FIG. 5D, the background other than the main object may be present within a frame 501 indicated by a dotted line in the vicinity of the center of the main object area. Accordingly, the vectors detected in the vector detection frame within the dotted-line frame 501 include vectors with a direction and size that are different from those of many of the vectors detected in the other vector detection frames within the dotted-line frame 501. Accordingly, in step S418, vectors having a direction and size that are different from those of the other vectors by the reference value or more are excluded, and the resultant vectors are averaged to thereby detect the object blur amount due to the camera shake and the motion of the object itself.

In step S419, the weighted average of the object blur amount and the camera shake amount detected in step S418 is calculated to thereby acquire the correction amount. The weight of the weighted average (hereinafter referred to as a correction ratio) is determined based on the set transition period Tch and an elapsed time from the start of transition processing. For example, the correction ratio is determined by the following expressions using the transition period Tch obtained in step S415 and an elapsed time Tpst from the start of transition processing.

Correction ratio of camera shake amount=1−$Tpst/Tch$

Correction ratio of object blur amount=$Tpst/Tch$

The sum of the correction ratio of the camera shake amount and the correction ratio of the object blur amount is 1.

Each blur correction amount is represented by the following expressions using the camera shake amount and the object blur amount obtained in step S418, and the camera shake correction amount and the object blur correction amount are added to thereby acquire the final blur correction amount.

Camera shake correction amount=correction ratio of camera shake amount×camera shake amount Object blur amount=correction ratio of object blur amount×object blur amount In step S409, the CPU 15 controls the image deformation clipping circuit 28 to perform image clipping based on the correction amount acquired in step S419, thereby generating a blur corrected image.

As described above, immediately after panning ends, the CPU 15 performs processing that transitions from the control of correcting camera shake that occurs in the captured image due to the movement of the image capturing apparatus 1 to the control of correcting object blur that occurs on the main object in the captured image.

In contrast, if the processing proceeds to step S421 from step S413 since the panning occurrence flag is turned off, panning has not occurred in the current frame and the previous frame (panning has ended prior to the previous frame, or panning has never occurred). Thus, the CPU 15 determines whether the period in which the processing transitions from the camera shake correction to the object blur correction has ended. The elapsed time Tpst from the start of transition processing is compared with the transition period Tch set in step S415. If Tpst≥Tch holds, it is determined that the transition period has ended.

If the transition period has ended (YES in step S421), the processing proceeds to step S422, and object blur correction processing is performed.

If the transition period has not ended (NO in step S421), the processing proceeds to step S416, and the transition processing to the object blur correction described above is performed.

In step S422, the CPU 15 sets the vector detection frame in the main object area. For example, the entire area of the screen is divided into a predetermined number (7×9 in this case) of blocks with a predetermined size, and these blocks are set as illustrated in FIG. 5A. Among these blocks, blocks (grayed-out blocks illustrated in FIG. 5A) that partially overlap the area included in the main object area are set as the vector detection frame for correcting object blur.

In step S423, the CPU 15 detects vectors in the frame set in step S422. In step S424, clustering for vector detection is performed, and a main object vector including motion components due to the movement of the main object is extracted to thereby detect the object blur amount (camera shake amount+object motion amount).

In step S425, the CPU 15 acquires a correction amount (first correction amount) for correcting blur that occurs on the object in the captured image based on the object blur amount detected in step S424. In step S409, the CPU 15 controls the image deformation clipping circuit 28 to perform image clipping based on the correction amount acquired in step S425, thereby generating a blur corrected image.

Thus, if panning has never occurred, or after a lapse of a predetermined period after the end of panning, blur (object blur) that occurs on the object in the captured image is corrected.

Figure 3:
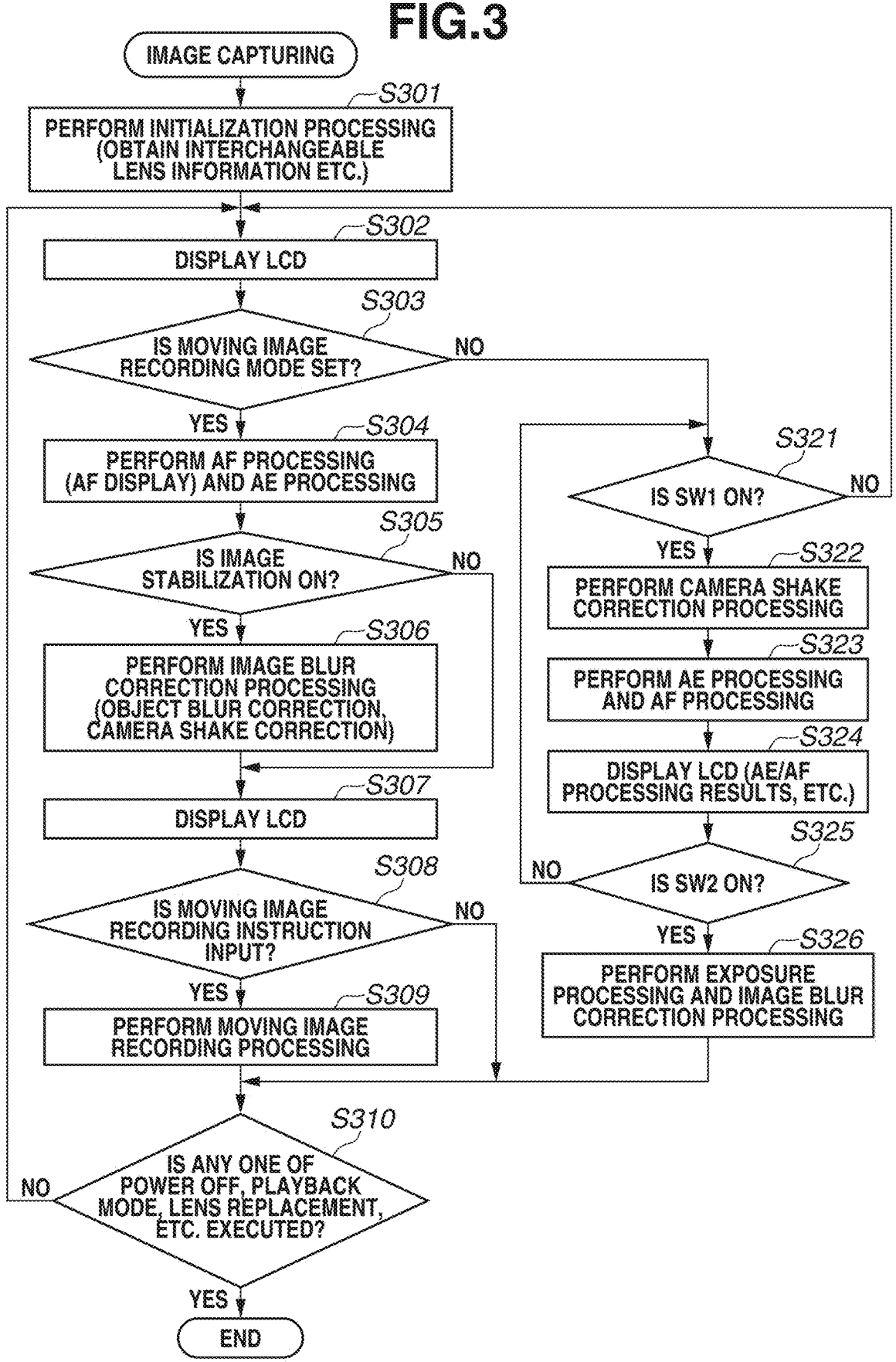
FIG. 3 is a flowchart illustrating an image capturing operation procedure according to the first exemplary embodiment.

Upon completion of the processing in step S409, the processing returns to step S307 illustrated in FIG. 3, and the processing from step S401 is executed again on the subsequent frame.

The clustering processing performed in step S407 and the like will now be described with reference to FIGS. 6A and 6B.

The motion vector detection, setting of clustering values, separation of vectors, and determination of separation results are performed, to thereby separate motion vectors, such as the main object vector and the background vector, in a case where a plurality of objects with different motions is present.

Figure 6A:
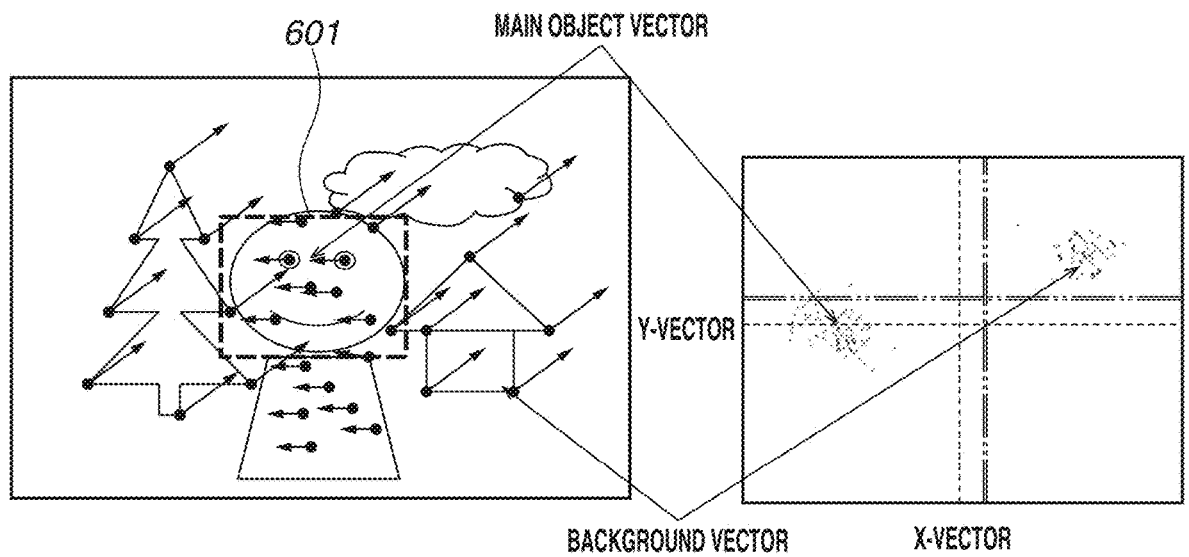
FIGS. 6A and 6B are explanatory diagrams each illustrating a clustering operation according to the first exemplary embodiment.
Figure 6B:
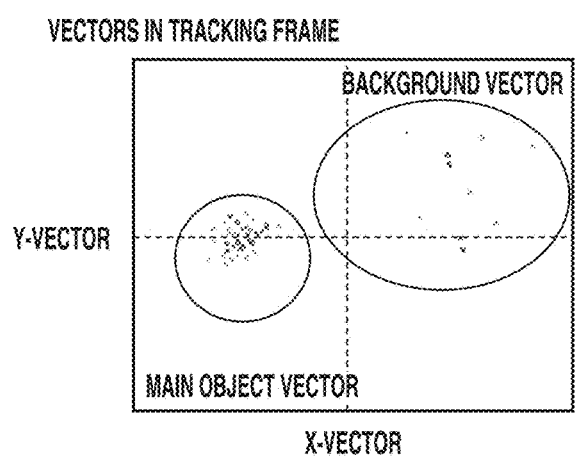

A frame indicated by a broken line in FIG. 6A corresponds to the tracking frame 601, and a main object is present in the frame. Assume that the main object moves as indicated by arrows, and the background also moves as indicated by arrows in FIG. 6A. Motion vectors in each of the horizontal (X-axis) direction and the vertical (Y-axis) direction are detected. A graph on the right side of FIG. 6A illustrates the detection result. On the graph, the vertical axis represents the motion vector in the Y-axis direction and the horizontal axis represents the motion vector in the X-axis direction. The motion vector of the main object is due to the motion of the object itself and panning intended by the user who tracks the object, and the motion vector of the background is mainly due to camera shake. Accordingly, the motion vector of the main object and the motion vector of the background have distinct differences as illustrated in the graph. In this example, the main object moves in the minus (left) direction in the horizontal direction, and thus X-motion vectors are distributed in the minus area and Y-motion vectors are distributed in the vicinity of zero. The background moves in the opposite direction from the movement direction of the main object, that is, in the plus (right) direction in the horizontal direction, and moves in the plus (upward) direction in the vertical direction. Thus, X-motion vectors are distributed in the plus area and Y-motion vectors are also distributed in the plus area.

These motion vectors are separated by setting clustering values. First, a mean value (XmeanAll) for all X-motion vectors and a mean value (YmeanAll) for all Y-motion vectors are obtained, and the detected motion vectors are separated using the mean values as clustering initial values. The obtained two mean values are used to separate the motion vectors illustrated in the graph of FIG. 6A into four areas.

In the example illustrated in FIG. 6A, when the motion vectors included in the areas divided by a double dashed line in the graph are checked, background motion vectors are present on the upper left area and main object motion vectors are present on the lower right area. Thus, when two types of motion vectors are present within the screen, the motion vectors can be separated. However, in the case of evaluating the motion vectors in the tracking frame as illustrated in FIG. 6B, most of the detected motion vectors are motion vectors corresponding to the motion of the object, which makes it difficult to separate the motion vectors.

Accordingly, in one embodiment, assuming that the same motion vectors are distributed in a range (XΔYΔ) in view of a detection error and the like, it is determined that only a single motion vector is included in the tracking frame if the number of vectors included in the range of XmeanAll±XΔ and YmeanAll±YA is more than or equal to a predetermined ratio (e.g., 80%), and thus the motion vector separation is not performed.

If the motion vector separation is not performed, a standard deviation (XσAll) for all X-motion vectors and a standard deviation (YσAll) for all Y-motion vectors are obtained. If these two values are less than or equal to a predetermined value (e.g., XσA11≤2·XΔ and YσA11≤2YΔ), it is determined that the vectors in the tracking frame can be acquired. Then, the motion vectors in the range of XmeanAll±XσAll and YmeanAll±YσAll are extracted, and a mean value (XmeanAllp) for all X-motion vectors and a mean value (YmeanAllp) for all Y-motion vectors are set as motion vectors within the tracking frame.

If the number of vectors included in the range of XmeanAll±XΔ and YmeanAll±YA is less than a predetermined ratio (e.g., 80%), it is determined that the motion vectors can be separated. Accordingly, the validity of separating the motion vectors is determined by evaluating the number of motion vectors in each area and the distribution range of the motion vectors.

A mean value (Xmean[n]·Ymean[n]) for X-motion vectors and Y-motion vectors included in each area is obtained. The area where the number of vectors included in the range of Xmean[n]±XΔ and Ymean[n]±YΔ among the vectors included in each area is more than or equal to a predetermined amount (e.g., 20% of all vectors) is determined to be the area where any one of objects with different motions is present.

In this case, a standard deviation (Xσ[n]) for all X-motion vectors and a standard deviation (Yσ[n]) for all Y-motion vectors are obtained. If these two values are less than or equal to the predetermined value (e.g., XσA11≤2·XΔ and YσA11≤2YΔ), it is determined that the vectors in the area within the tracking frame can be acquired.

In the area where it is determined that the vectors can be acquired, the motion vectors in the range of Xmean[n]±Xσ[n] and Ymean[n]±Yσ[n] are extracted. A mean value (Xmean[n]p) for the extracted X-motion vectors and a mean value (Ymean[n]p) for the extracted Y-motion vectors are set as the motion vector in the tracking frame. A plurality of such motion vectors can be obtained.

If motion vectors can be detected in a plurality of areas within the tracking frame, Xmean[n]p·Ymean[n]p in which the number of detected vectors is maximum is selected. However, if the number of extracted vectors is less than the predetermined value, it is determined that it is impossible to detect any motion vector and the vector value is set to zero, thereby determining that there is no moving object within the detected tracking frame.

As described above, in the present exemplary embodiment, the main object detection circuit 26 functions as an object detection unit that detects a position where a main object is present. The motion vector detection circuit 27 functions as a first motion detection unit that detects a motion in the image of the main object based on the main object vector, and also functions as a second motion detection unit that detects the motion of the image capturing apparatus 1 based on the background vector. The shake detection sensor 14 and the shake detection circuit 13 may function as the second motion detection unit that detects the movement of the image capturing apparatus 1.

The CPU 15 functions as a main object position change amount calculation unit that calculates the amount of change in the position of the main object based on the output from the main object detection unit. The CPU 15 also functions as a unit that calculates the movement of the main object based on the motion vector output from the motion vector detection circuit 27 and the output from the shake detection circuit 13, and calculates the movement of the image capturing apparatus 1 based on the output from the shake detection circuit 13, thereby calculating the difference between the movement of the main object and the movement of the image capturing apparatus 1. The CPU 15 also functions as a determination unit that detects an intentional main object changing operation (panning) based on the amount of change in the position of the main object, the difference between the movement of the main object and the movement of the image capturing apparatus 1, and the movement of the image capturing apparatus 1. The CPU 15 also functions as a blur correction amount acquisition unit that calculates the correction amount to correct blur that occurs on the object in the captured image. The CPU 15 also functions as a correction direction setting unit that sets a predetermined direction in which a blur correction is performed during the main object change operation.

In the present exemplary embodiment, the above-described smooth processing enables acquisition of a smooth moving image by correcting camera shake in a predetermined direction during a main object change operation even when the main object is changed by the user during an object blur correction control operation. In the present exemplary embodiment, moving images on which the processing illustrated in FIG. 4 is performed include a moving image to be recorded and a moving image to be displayed as a live view image before recording is started. The processing illustrated in FIG. 4 may be performed on only one of the moving images. Alternatively, the processing illustrated in FIG. 4 may be performed on a live image before still image capturing, or may be performed on a plurality of images recorded during continuous image capturing (continuous shooting). Assuming that each one of still images captured by continuous shooting corresponds to each one frame of a moving image, the present exemplary embodiment can also be applied to continuous image capturing.

Second Exemplary Embodiment

A method of determining whether the main object is intentionally changed by the user according to a second exemplary embodiment is different from that of the first exemplary embodiment. In the first exemplary embodiment, it is determined whether the main object is intentionally changed by the user based on whether panning has occurred. In the second exemplary embodiment, it is determined that the main object is intentionally changed by the user when changing of the focal length during image capturing by the user, changing of focus by a predetermined amount or more, changing of the exposure amount by a predetermined amount or more, or the like is detected. The configuration of the image capturing system 100, the main object detection processing flow, and the image capturing flow other than the image blur correction processing (step S306) are similar to those of the first exemplary embodiment, and thus the descriptions thereof are omitted.

Figure 7:
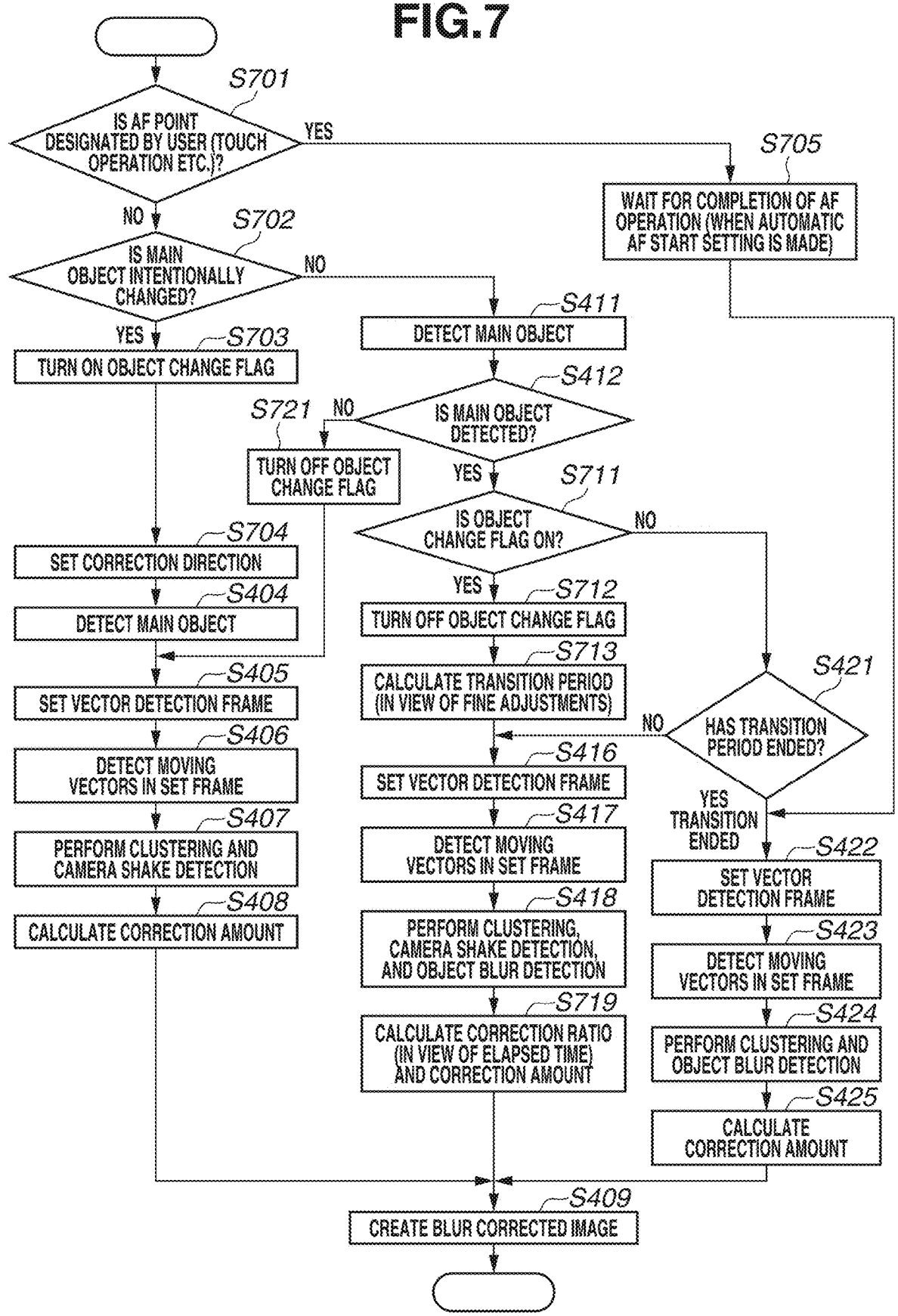
FIG. 7 is a flowchart illustrating an operation procedure for image blur correction processing according to a second exemplary embodiment.

FIG. 7 illustrates an operation procedure for image blur correction processing according to the second exemplary embodiment. The same processes as those in the first exemplary embodiment are denoted by the same step numbers and the descriptions thereof are omitted.

In step S701, the CPU 15 determines whether any AF point is designated by the user through, for example, a touch operation on a menu or the LCD screen. If any AF point is designated (YES in step S701), the main object area is designated by the user. Accordingly, the processing proceeds to step S705. In the processing of step S705 and subsequent steps, an object in the designated main object area, or an object in the vicinity of the designated main object area is set as the main object, and the processing transitions to the object blur correction so that the position of the main object can be maintained at the same position on the image.

In step S705, when any AF point is designated by the user and a setting for automatically starting an AF operation is made, the CPU 15 waits for completion of the AF operation (completion of an in-focus operation on the object at the designated AF point), and the processing proceeds to step S422. When the automatic AF operation start setting is not made, the processing immediately proceeds to step S422. Further, the processing of steps S422 to S409 that are identical to those in the first exemplary embodiment is performed to correct blur (object blur) that occurs on the main object in the captured image.

If the CPU 15 determines that no AF point is designated (NO in step S701), the processing proceeds to step S702. In step S702, it is determined whether the main object is intentionally changed by the user. If the main object is intentionally changed (YES in step S702), the processing proceeds to step S703. In step 702, it is determined whether the main object is changed based on whether each of the focal length, the focus position, and the exposure amount is changed by a predetermined amount or more by the user. If at least one of the focal length, the focus position, and the exposure amount is changed by the predetermined amount or more, it is determined that the main object is intentionally changed by the user. If none of the focal length, the focus position, and the exposure amount is changed by the predetermined amount or more, it is determined that the main object is not intentionally changed by the user.

An operation for changing the focal length of the interchangeable lens 31 by the user is performed by, for example, operating a zoom ring (not illustrated) of the interchangeable lens 31. This operation is implemented by a mechanical structure in which a zoom lens (not illustrated) constituting the image capturing optical system is configured to move in proportion to the operation amount of the zoom ring. Alternatively, the zoom lens may be configured to move by driving the actuator in proportion to the operation amount of the zoom ring. In this case, instead of using the zoom ring, a zoom lever or a zoom button may be used as an operation unit. The focus position changing operation of the user is performed by, for example, operating a manual focus ring (not illustrated) for adjusting the focus of the interchangeable lens 31. This operation is implemented by a mechanical structure in which the focus lens 33 is configured to move in proportion to the operation amount of the manual focus ring. Alternatively, the focus lens 33 may be configured to move by driving the actuator in proportion to the operation amount of the manual focus ring. In this case, instead of using the manual focus ring, a manual focus button may be used as the operation unit. If the focus lens 33 is electronically controlled as described above, a single ring member may function as the zoom ring and the manual focus ring.

In the present exemplary embodiment, when the focal length is changed by the predetermined amount or more by the user, or when the focus position is changed by the predetermined amount or more, it is determined that the main object is intentionally changed by the user. During the change operation, in one embodiment, blur that occurs due to the movement of the main object itself is not corrected and only the camera shake is corrected.

The exposure correction amount, the exposure time, and the aperture value are changed by, for example, operating the exposure correction amount change dial, the exposure time change dial, and the aperture value change dial serving as the operation switch 18. When the exposure correction amount is changed, the CPU 15 calculates the exposure time of the image sensor 3 and the aperture value of the aperture 34 based on the exposure correction amount and the AE evaluation value. When one or both of the exposure time and the aperture value are changed, the exposure time or the aperture value is calculated, as needed, based on the set values and the image capturing mode. Aperture value information about the aperture 34 is transmitted to the interchangeable lens 31 through the communication driver 21. Aperture driving processing and the like are performed on the interchangeable lens 31, and the aperture amount of the aperture 34 is adjusted to an appropriate value. The CPU 15 controls the exposure time of the image sensor 3 through the TG 16 and the image sensor driver 17, thereby appropriately adjusting the exposure time.

In the present exemplary embodiment, it is determined that the main object is intentionally changed by the user, when the exposure amount is changed by the predetermined amount or more by the user (the exposure correction amount changed by the predetermined amount or more, or the exposure amount from a combination of the exposure time and the aperture value changed by the predetermined amount or more). In one embodiment, during the change operation, blur that occurs due to the movement of the main object itself is not corrected and only the camera shake is corrected.

If it is determined that the main object is intentionally changed in step S702 (YES in step S702), the processing proceeds to step S703. In step S703, the CPU 15 turns on a flag (hereinafter referred to as an object change flag) indicating that the main object is intentionally changed by the user, and the processing proceeds to step S704. In step S704, the CPU 15 sets a camera shake correction direction. The method of setting the correction direction varies depending on whether panning of the image capturing apparatus 1 has occurred during the operation of changing at least one of the focal length, the focus position, and the exposure amount by the predetermined value or more by the user. If panning of the image capturing apparatus 1 has not occurred, all directions (i.e., the pitch direction, the yaw direction, and the roll direction) in which the image capturing apparatus 1 can correct the camera shake are set. In contrast, if panning of the image capturing apparatus 1 has occurred, the movement direction of the image capturing apparatus 1 is obtained, the direction on the image sensor 3 that is orthogonal to the movement direction is calculated, and then the calculated direction is set as an image blur correction direction during occurrence of panning, similarly to step S403 according to the first exemplary embodiment.

Thereafter, the processing of steps S404 to S409 is performed in the same manner as in the first exemplary embodiment, and the camera shake in the correction direction set in step S704 is corrected.

Thus, if at least one of the focal length, the focus position, and the exposure amount is changed by the predetermined amount or more by the user, it is determined that the main object is intentionally changed by the user and blur (camera shake) that occurs in the captured image due to the motion of the image capturing apparatus 1 is corrected. In contrast, if it is determined that the main object is not intentionally changed by the user in step S702 (NO in step S702), the processing proceeds to step S411. In step S411 and subsequent steps, the camera shake correction is performed if no main object is detected, similarly to the first exemplary embodiment. If the main object is detected and the transition period in which the processing transitions from the camera shake correction to the object blur correction has ended, the object blur correction is performed. During the transition period, the camera shake correction and the object blur correction are performed in combination.

In steps S411 and S412, similarly to the first exemplary embodiment, the CPU 15 controls the main object detection circuit 26 to detect a main object and determines whether the main object is detected.

If no main object is detected (NO in step S412), the processing proceeds to step S721. If the object change flag is turned on in step S703 on the previous frame, the flag is turned off, and the processing proceeds to step S405. In the processing of step S405 and subsequent steps, the camera shake is corrected, similarly to the first exemplary embodiment.

If the main object is detected (YES in step S412), the processing proceeds to step S711. In step S711, it is determined whether the object change flag is on.

If the object change flag is on (YES in step S711), the processing proceeds to step S712. In step S712, the object change flag that is turned on in step S703 is turned off, and the processing proceeds to step S713.

The processing of step S713 and subsequent steps is processing that gradually transitions from the camera shake correction performed during occurrence of panning to the object blur correction (correction of blur that occurs on the object in the captured image due to the camera shake and the movement of the object itself). In step S713, the transition period Tch is set, similarly to step S415 according to the first exemplary embodiment. The processing proceeds to step S713 in a case where an operation (operation of changing the focal length, the focus position, or the exposure amount) in which it is estimated that the main object is changed has occurred in the previous frames. Accordingly, it may be desirable to determine the transition period Tch based on the period in which the operation that has occurred in the previous frames continuously occurs. For example, the transition period Tch is set to be equal to a period Top required for the operation of changing the focal length, the focus position, or the exposure amount by the user, thereby making it possible to acquire a smooth video image. However, a fine adjustment operation can be performed at the end of the member operation in some cases. In view of this operation period, a period obtained by adding a period Top$^+$ corresponding to 10 to 20% of an average time required for the change operation is set as the transition period.

That is, the transition period Tch=Top+Top$^+$.

The period Top$^+$ may be determined in view of the focal length. In this case, the value at the focal length of 50 mm is determined first. When the focal length is in the range from 24 mm to 200 mm, the value is set to be proportional to the focal length. When the focal length is less than 24 mm, the value is set to the value equal to the value at the focal length of 24 mm. When the focal length exceeds 200 mm, the value is set to the value equal to the value at the focal length of 200 mm. For example, the value at the focal length of 100 mm is set to twice as much as the value at the focal length of 50 mm. The value at the focal length of 25 mm is set to half of the value at the focal length of 50 mm.

According to the second exemplary embodiment, the panning (tilting) speed is not reflected to the transition period even when panning (tilting) occurs, unlike in the first exemplary embodiment. In step S713, the transition period Tch is set, and the processing transitions from the camera shake correction to the object blur correction. Accordingly, the processing of steps S416 to S418 is performed in the same manner as in the first exemplary embodiment, and the processing proceeds to step S719.

In step S719, the weighted average of the camera shake amount detected in step S418 and the object blur amount is calculated to thereby acquire the correction amount, similarly to step S419. The correction ratio is determined based on the set transition period Tch and the elapsed time from the start of transition processing. In this case, during the fine adjustment period at the end of the member operation, the correction ratio is determined to correct camera shake.

For example, the correction ratio is determined by the following expressions using the transition period Tch obtained in step S713, the period Top$^+$ determined in view of the fine adjustment operation, and the elapsed time Tpst after the start of transition processing.

(when $Tpst<Top^+$)

Correction ratio of camera shake amount=1

Correction ratio of object amount=0

(when $Top^+ \leq Tpst \leq Tch$)

Correction ratio of camera shake amount=1−($Tpst$−$Top^+$)/($Tch$−$Top^+$)

Correction ratio of object blur amount=($Tpst$−$Top^+$)/($Tch$−$Top^+$)

The sum of the correction ratio of the camera shake amount and the correction ratio of the object blur amount is 1.

Each blur correction amount is represented by the following expressions using the camera shake amount and the object blur amount obtained in step S418, and the camera shake correction amount and the object blur correction amount are added to thereby acquire the final blur correction amount.

Camera shake correction amount=correction ratio of camera shake amount×camera shake amount Object blur amount=correction ratio of object blur amount×object blur amount After that, the processing of step S409 is performed in the same manner as in the first exemplary embodiment, to thereby perform image blur correction processing.

Thus, immediately after any one of the focal length, the focus position, and the exposure amount is changed by the predetermined value or more during image capturing by the user, the transition processing from the control for correcting camera shake to the control for correcting object blur that occurs on the main object in the captured image is performed.

In contrast, if the flag is not on (NO in step S711), the processing proceeds to step S421. In step S421, it is determined whether the period in which the processing transitions from the camera shake correction to the object blur correction has ended, similarly to the first exemplary embodiment.

If the transition period has ended (YES in step S421), the processing proceeds to step S422, and object blur correction processing is performed. If the transition period has not ended (NO in step S421), the processing proceeds to step S416 and the transition processing from the camera shake correction to the object blur correction is performed. After completion of the processing in step S409, the processing proceeds to processing on the subsequent frame and the processing from step S701 is executed again.

As described above, in the present exemplary embodiment, the CPU 15 also functions as the determination unit that detects an intentional main object change operation based on an operation of changing the local length during image capturing by the user, an operation of changing the focus position by a predetermined amount or more, an operation of changing the exposure correction amount by a predetermined amount or more, or the like. The CPU 15 also functions as a unit that calculates a predetermined direction in which an object blur correction is performed during the main object change operation.

The CPU 15 also functions as a unit that detects that the AF area is changed from the AF area detected by the main object area detection unit. The CPU 15 also functions as a unit that detects a focus change operation or an exposure amount change operation by the user in response to an output from the operation switch 18. The CPU 15 also functions as the determination unit that detects an intentional main object change operation by the user based on a change in at least one of the focal length, the focus position, the exposure amount, and the AF area. The CPU 15 also functions as the correction direction setting unit that determines a predetermined direction in which blur correction is performed during the main object change operation.

In the present exemplary embodiment, the above-described processing enables stable moving image capturing by correcting camera shake in a predetermined direction during the main object change operation even when the main object is changed by the user during the object blur correction control operation. In addition, a stable video image can be provided by reducing camera shake that increases during an operation of each member.

While exemplary embodiments of the disclosure have been described above, the disclosure is not limited to these exemplary embodiments. The disclosure can be modified or changed in various ways within the scope of the disclosure.

The first and second exemplary embodiments described above illustrate an example where a lens-interchangeable image capturing apparatus is used. The disclosure is also applicable to image blur correction in a digital video camera, a lens-integrated digital camera, and the like. The disclosure is also applicable to a camera including an automatic image capturing function for automatically capturing images, independently of an image capturing instruction from the user. The disclosure is also applicable to an image capturing apparatus to be attached to a panhead, and an image capturing apparatus having a panning and tilting (PT) mechanism for performing panning and tilting in response to a user instruction or the like. In this case, examples of panning according to the first and second exemplary embodiments include not only panning due to a movement of the user, but also panning by driving the panhead or the PT mechanism in response to a user instruction.

While the first and second exemplary embodiments described above use a so-called electronic image blur correction unit that electronically corrects object blur as a correction unit that corrects object blur, an optical image blur correction unit can also be used. As the optical image blur correction unit, a correction unit that performs blur correction by moving the image blur correction lens 32, or a correction unit that performs blur correction by moving the image sensor 3 can be used.

The method of determining whether the main object is changed according to the first exemplary embodiment may be combined with the method of determining whether the main object is changed according to the second exemplary embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-108058, filed Jun. 29, 2021, which is hereby incorporated by reference herein in its entirety.

What is claimed is:

1. An apparatus comprising:
one or more processors and/or circuitry which function as:
an object detection unit configured to detect a main object;
a first motion detection unit configured to detect a motion vector of the main object;
a second motion detection unit configured to detect a movement of a capturing apparatus;
a first acquisition unit configured to acquire a first blur correction amount to correct image blur on the main object based on the detected motion vector of the main object;
a second acquisition unit configured to acquire a second blur correction amount to correct a shake of the capturing apparatus based on the detected movement of the capturing apparatus;
a control unit configured to control a correction unit based on at least one of the first blur correction amount and the second blur correction amount; and
a determination unit configured to determine whether the main object is changed between a first timing when a first image is captured and a second timing when a second image is captured,
wherein in a case where the determination unit determines that the main object is changed, the control unit changes a control from image blur correction based on the first blur correction amount to image blur correction based on the second blur correction amount.

2. The apparatus according to claim 1, wherein in a case where a difference between a position of the main object in the first image and a position of the main object in the second image is greater than or equal to a first predetermined value, the determination unit determines that the detected main object is changed.

3. The apparatus according to claim 2, wherein the first predetermined value varies depending on a focal length of an optical system.

4. The apparatus according to claim 1, wherein in a case where a difference between a movement amount in a captured image of the main object from the first timing to the second timing and a motion amount of the capturing apparatus from the first timing to the second timing is greater than or equal to a second predetermined value, the determination unit determines that the main object is changed.

5. The apparatus according to claim 4, wherein the second predetermined value varies depending on a focal length of an optical system.

6. The apparatus according to claim 1, wherein in a case where a motion amount of the capturing apparatus from the first timing to the second timing is more than or equal to a third predetermined value, the determination unit determines that the main object is changed.

7. The apparatus according to claim 6, wherein the third predetermined value varies depending on a focal length of an image capturing optical system.

8. The apparatus according to claim 1, wherein in a case where an amount of change in a focal length of an optical system from the first timing to the second timing is greater than or equal to a fourth predetermined value, the determination unit determines that the main object is changed.

9. The apparatus according to claim 1, wherein in a case where an amount of change in a focus position of an optical system from the first timing to the second timing is greater than or equal to a fifth predetermined value, the determination unit determines that the main object is changed.

10. The apparatus according to claim 1, wherein in a case where an amount of change in an exposure amount of an optical system from the first timing to the second timing is greater than or equal to a sixth predetermined value, the determination unit determines that the main object is changed.

11. The apparatus according to claim 1, one or more processors and/or circuitry further function as a setting unit configured to set a correction direction in which image blur correction is performed,
wherein in a case where the determination unit determines that the main object is changed, the control is changed from image blur correction based on the first blur correction amount to image blur correction based on the second blur correction amount in the set correction direction.

12. The apparatus according to claim 11,
wherein the determination unit determines whether the main object is changed based on at least one of an amount of change in a focal length of an optical system, an amount of change in a focus position of the optical system, and an amount of change in an exposure amount of the optical system, and
wherein in a case where the determination unit determines that the main object is changed based on at least one of the amount of change in the focal length, the amount of change in the focus position, and the amount of change in the exposure amount, the correction unit performs image blur correction in a blur correction direction.

13. The apparatus according to claim 1, wherein in a case where the determination unit determines that changing of the main object is completed, the control is changed to image blur correction based on the first blur correction amount after a lapse of a predetermined period.

14. The apparatus according to claim 13, one or more processors and/or circuitry further function as a setting unit configured to set the predetermined period depending on at least one of time required for changing the main object, a focal length of an optical system, a motion amount of the capturing apparatus, and a movement speed of the capturing apparatus.

15. The apparatus according to claim 13, wherein in a case where the determination unit determines that changing of the main object is completed, during a transition period before the predetermined period has elapsed, image blur correction is performed based on the first blur correction amount and the second blur correction amount.

16. The apparatus according to claim 1,
wherein the second motion detection unit includes a sensor and a background vector acquisition unit configured to acquire a background vector as a motion vector due to the movement of the capturing apparatus,
wherein the second acquisition unit acquires the second blur correction amount based on the acquired background vector, and
wherein the determination unit determines whether the main object is changed based on an output from the sensor.

17. An image capturing control apparatus comprising:
the apparatus according to claim 1; and
a sensor,
wherein the object detection unit detects the main object from a captured image acquired by the sensor.

18. A method comprising:
detecting a main object;
detecting, as a first motion detection, a motion vector of the main object;
detecting, as a second motion detection, a movement of a capturing apparatus;
acquiring, as a first blur correction amount acquisition, a first blur correction amount to correct image blur on the main object based on the detected motion vector of the main object;
acquiring, as a second blur correction amount acquisition, a second blur correction amount to correct a shake of the capturing apparatus based on the detected movement of the capturing apparatus;
controlling, as an image blur correction control, a correction unit based on at least one of the first blur correction amount and the second blur correction amount; and
determining whether the main object is changed between a first timing when a first image is captured and a second timing when a second image is captured,
wherein in the determination, in a case where it is determined that the main object is changed, the control of the correction unit in the image blur correction control is changed from image blur correction based on the first blur correction amount to image blur correction based on the second blur correction amount.

19. The method according to claim 18, wherein in a case where a difference between a position of the main object in the first image and a position of the main object in the second image is greater than or equal to a first predetermined value, the determining determines that the detected main object is changed.

20. A non-transitory computer-readable storage medium configured to store a program causing a computer to execute an image processing method, the image processing method comprising:
detecting a main object;
detecting, as a first motion detection, a motion vector of the main object;
detecting, as a second motion detection, a movement of a capturing apparatus;
acquiring, as a first blur correction amount acquisition, a first blur correction amount to correct image blur on the main object based on the detected motion vector of the main object;
acquiring, as a second blur correction amount acquisition, a second blur correction amount to correct a shake of the capturing apparatus based on the detected movement of the capturing apparatus;
controlling, as an image blur correction control, a correction unit based on at least one of the first blur correction amount and the second blur correction amount; and
determining whether the main object is changed between a first timing when a first image is captured and a second timing when a second image is captured,
wherein in the determination, in a case where it is determined that the main object is changed, the control of the correction unit in the image blur correction control is changed from image blur correction based on the first blur correction amount to image blur correction based on the second blur correction amount.

* * * * *